(12) United States Patent
Omori et al.

(10) Patent No.: US 11,042,724 B2
(45) Date of Patent: Jun. 22, 2021

(54) IMAGE PROCESSING DEVICE, IMAGE PRINTING DEVICE, IMAGING DEVICE, AND NON-TRANSITORY MEDIUM

(71) Applicant: SHARP KABUSHIKI KAISHA, Sakai (JP)

(72) Inventors: Keisuke Omori, Sakai (JP); Kei Tokui, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 222 days.

(21) Appl. No.: 16/473,751

(22) PCT Filed: Nov. 29, 2017

(86) PCT No.: PCT/JP2017/042893
§ 371 (c)(1),
(2) Date: Jun. 26, 2019

(87) PCT Pub. No.: WO2018/123413
PCT Pub. Date: Jul. 5, 2018

(65) Prior Publication Data
US 2021/0133427 A1    May 6, 2021

(30) Foreign Application Priority Data
Dec. 27, 2016    (JP) ............................. JP2016-253888

(51) Int. Cl.
*G06K 9/00*    (2006.01)
*G06T 3/40*    (2006.01)

(52) U.S. Cl.
CPC ..... *G06K 9/00228* (2013.01); *G06K 9/00281* (2013.01); *G06T 3/40* (2013.01)

(58) Field of Classification Search
None
See application file for complete search history.

(56) References Cited

U.S. PATENT DOCUMENTS

| 8,218,895 B1* | 7/2012 | Gleicher | ............... G06T 3/0025 382/275 |
| 10,019,638 B2* | 7/2018 | Omi | ...................... G08B 21/06 |

(Continued)

FOREIGN PATENT DOCUMENTS

| JP | 2004-264893 A | 9/2004 |
| JP | 2009-048447 A | 3/2009 |

(Continued)

OTHER PUBLICATIONS

Photoshop CC, "HowTo Use Face-Aware Liquify In Photoshop CC" https://www.photoshopessentials.com/photo-editing/use-face-aware-liquify-photoshop-cc/, Jun. 2016 (Year: 2016).*

*Primary Examiner* — Randolph I Chu
(74) *Attorney, Agent, or Firm* — ScienBiziP, P.C.

(57) ABSTRACT

An image processing device image processing device (100), in which correction is less likely to be impossible or correction is less likely to be inappropriate as compared with that in the related art, performs, on an image including a face (500), correction processing to reduce/expand a first correction region (501) of a circle that is located at a position corresponding to a center of the face (500) and that has a size depending on a size of the face (500) and to expand/reduce a second correction region (502) around the first correction region.

12 Claims, 18 Drawing Sheets

(56) References Cited

U.S. PATENT DOCUMENTS

| | | | | |
|---|---|---|---|---|
| 10,812,678 B2* | 10/2020 | Omori | ........................ | G06T 1/00 |
| 2006/0133654 A1* | 6/2006 | Nakanishi | ............ | G06K 9/4642 |
| | | | | 382/118 |
| 2007/0160293 A1* | 7/2007 | Ishikawa | ............ | G06K 9/00241 |
| | | | | 382/181 |
| 2009/0237679 A1* | 9/2009 | Usui | .................... | H04N 1/3875 |
| | | | | 358/1.2 |
| 2009/0245650 A1* | 10/2009 | Shingai | ................ | G06K 9/3208 |
| | | | | 382/195 |
| 2010/0054620 A1* | 3/2010 | Kobayashi | ............ | G06T 3/0093 |
| | | | | 382/256 |
| 2010/0135532 A1 | 6/2010 | Nakagomi | | |
| 2012/0051658 A1* | 3/2012 | Tong | .................... | G11B 27/034 |
| | | | | 382/224 |
| 2013/0342582 A1* | 12/2013 | Gotohda | ................. | G06T 19/00 |
| | | | | 345/672 |
| 2015/0102998 A1* | 4/2015 | Oami | .................... | H04N 9/3194 |
| | | | | 345/156 |
| 2016/0314366 A1* | 10/2016 | Omi | .................... | H04N 5/23229 |
| 2016/0335495 A1* | 11/2016 | Kim | .................... | G06K 9/00281 |
| 2020/0051221 A1* | 2/2020 | Omori | ........................ | G06T 3/40 |

FOREIGN PATENT DOCUMENTS

| | | |
|---|---|---|
| JP | 2010-152871 A | 7/2010 |
| JP | 2012-142772 A | 7/2012 |
| JP | 2013-098925 A | 5/2013 |

* cited by examiner

IMAGE PROCESSING DEVICE, IMAGE PRINTING DEVICE, IMAGING DEVICE, AND NON-TRANSITORY MEDIUM

TECHNICAL FIELD

One aspect of the present disclosure relates to an image processing device for correcting an image including a face as an imaging object.

BACKGROUND ART

Techniques for changing an impression of an imaging object are widely used for images by making corrections to expand or reduce certain regions. For example, an image including a person as an imaging object can be corrected, by reducing a region corresponding to a face of the person, such that an impression of the imaging object that the face thereof is smaller than the actual face can be given. In a case that a correction is made to a similar image by reducing a region corresponding to the entire body in a right-left direction, an impression of the imaging object that a body thereof is thinner than the actual body can be given, and in a case that a correction is made by expanding a region corresponding to legs thereof in an up-down direction, an impression of the imaging object that the legs thereof are smarter than the actual legs can be given.

For example, PTL 1 can be cited as a document that discloses an image processing device for obtaining an image having a change in the impression of a face. In the image processing device described in PTL 1, a correction is made to an image including a face as an imaging object depending on a face type (such as a "round face", a "narrow face", a "square face", or the like) identified based on a length L1 of the face and a width L2 of the face.

CITATION LIST

Patent Literature

PTL 1: JP 2004-264893 A

SUMMARY OF INVENTION

Technical Problem

However, the image processing device described in PTL 1 has the following problems.

Specifically, in the image processing device disclosed in PTL 1, face parts such as a crown, a chin, a mouth, a right cheek, and a left cheek are detected from an image including a face as an imaging object, and then, a distance from the crown to the chin is calculated as the length L1 of the face and a distance from the right cheek to the left cheek at a height of the mouth is calculated as the width L2 of the face. However, these face parts of which positions need to be referred to in order to calculate the length L1 of the face and the width L2 of the face are not always detectable from the image including the face as the imaging object.

In particular, the face parts defining a facial contour, such as a chin and a cheek, are likely to fail to be detected or likely to be erroneously detected. For example, in a case that a person that is an imaging object puts a hand on his/her cheek, it difficult to accurately detect a boundary between the cheek and the hand because the cheek and the hand are both skin color. Thus, the cheek may fail to be detected, or a portion other than the cheek may be erroneously detected as a cheek. The boundary of the chin and the neck is often blurred depending on the orientation of the face, orientation of a camera, or lighting conditions. Thus, the chin may fail to be detected or a portion other than the chin may be erroneously detected as the chin.

In a case that the cheek or the chin fails to be detected, the face type cannot be identified because the length L1 of the face or the width L2 of the face cannot be calculated so that a correction is not possible. In a case that the cheek or the chin is erroneously detected, the correct length L1 of the face or the correct width L2 of the face cannot be calculated so that the correct face type cannot be identified, resulting in an inappropriate correction.

As described above, the image processing device disclosed in PTL 1 requires the detection of the face parts (specifically, the chin and the cheek) that define the facial contour, which are likely to fail to be detected or likely to be erroneously detected. Therefore, the image processing device described in PTL 1 has a problem in that a correction is likely to be impossible or a correction is likely to be inappropriate.

One aspect of the present disclosure has been made in view of the problems described above, and an object of one aspect of the present disclosure is to achieve an image processing device in which a correction is less likely to be impossible or a correction is less likely to be inappropriate as compared with that in the related art.

Solution to Problem

An image processing device according to an aspect of the present disclosure is an image processing device for correcting an image including a face, the image processing device including: a corrector configured to perform, on the image, correction processing to reduce a first correction region of a prescribed shape that is located at a position corresponding to a center of the face and that has a size depending on a size of the face and to expand a second correction region around the first correction region, or correction processing to expand the first correction region and reduce the second correction region.

Advantageous Effects of Invention

According to an aspect of the present disclosure, it is possible to achieve an image processing device in which a correction is less likely to be impossible or a correction is less likely to be inappropriate as compared with that in the related art.

BRIEF DESCRIPTION OF DRAWINGS

FIG. 8D represents a displacement of each point due to a correction.

In FIG. 10B, the face on an upper side is a face obtained by correcting to reduce the first correction region in an isotropic manner, and the face on a lower side is a face obtained by correcting to reduce the first correction region in a non-isotropic manner.

DESCRIPTION OF EMBODIMENTS

First Embodiment

An image processing device 100 according to a first embodiment of the present disclosure will be described with reference to FIG. 1 to FIG. 9B. The image processing device 100 according to the present embodiment is a device for making a correction to an image including a face as an imaging object to reduce or expand an area corresponding to the face in an isotropic manner.

Configuration of Image Processing Device

Figure 1:
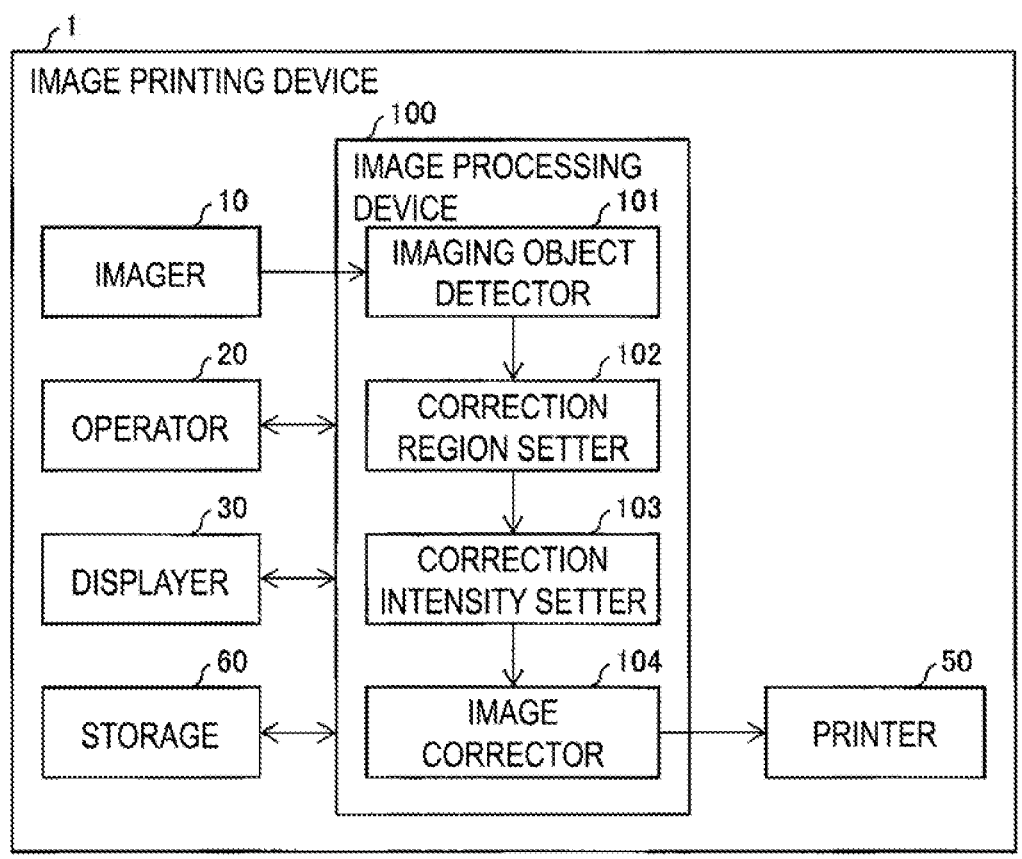
FIG. 1 is a block diagram illustrating a configuration of an image printing device according to an embodiment of the present disclosure.

First, an example of a configuration of an image printing device 1 will be described based on FIG. 1. FIG. 1 is a functional block diagram illustrating the configuration of the image printing device 1 in the present embodiment. As illustrated in FIG. 1, the image printing device 1 includes an imager 10, an operator 20, a displayer 30, an image processing device 100 (controller), a printer 50, and a storage 60.

The imager 10 images an imaging object, and transmits the imaged image as an input image to the image processing device 100.

The operator 20 receives a user input, and is implemented by, for example, a touch panel and a mouse. For example, in a case that the operator 20 is a touch panel, the input image is displayed on the displayer 30 provided with the touch panel.

The displayer 30 displays various images. The displayer 30 displays, for example, the image imaged by the imager 10 or an output image generated by an image corrector 104 described later.

The image processing device 100 functions as an image processing device that performs image processing on the image (input image) imaged by the imager 10, and generates an output image after the processing (after the correction). In the present embodiment, the image processing device 100 also functions as a controller that generally controls the image printing device 1. A specific configuration of the image processing device 100 will be described later.

The printer 50 prints the output image (image) generated by the processing of the image processing device 100. The printer 50 may print an image drawn by the user via the operator 20 further on the output image.

The storage 60 is configured to store various control programs and the like performed by the image processing device 100, for example, and includes a non-volatile storage device such as a hard disk and a flash memory. The storage 60 stores the input image and the output image, for example. The storage 60 may store parameters and the like necessary for the processing of the image processing device 100, such as the image processing (correction processing), imaging object detection processing, and the like.

Note that the controller that controls the image printing device 1 does not necessarily need to be the image processing device 100. For example, an external device capable of being communicatively coupled to the image printing device 1 may function as the image processing device 100.

Configuration of Image Processing Device

Figure 2:
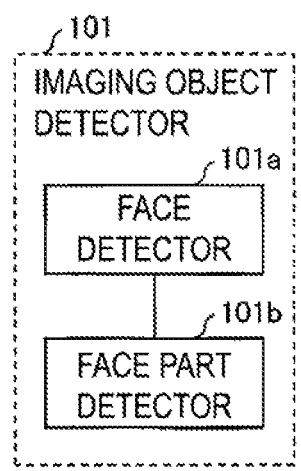
FIG. 2 is a block diagram illustrating a configuration of an imaging object detector included in an image processing device of the image printing device illustrated in FIG. 1.

Next, a configuration of the image processing device 100 will be described with reference to FIG. 1 and FIG. 2. FIG. 2 is a block diagram illustrating a configuration of an imaging object detector 101 included in the image processing device 100.

As illustrated in FIG. 1, the image processing device 100 includes the imaging object detector 101, a correction region setter (setter) 102, a correction intensity setter (setter) 103, and an image corrector (corrector) 104. An image including a person's face as an imaging object is input to the image processing device 100. An image including a person's face as an imaging object that is input to the image processing device 100 is described below as an "input image."

The imaging object detector 101 is configured to detect a face of a person included as an imaging object in the input image and face parts. As illustrated in FIG. 2, for example, the imaging object detector 101 can be configured to include a face detector 101a and a face part detector 101b. The face detector 101a is configured to detect a region corresponding to the face (hereinafter, also simply referred to as a "face") in the input image. Note that, the detection of the region corresponding to the face can be made using a known algorithm (for example, using skin color information detected from the input image, or the like), and therefore, is not described in detail here. The face part detector 101b is configured to detect a region corresponding to a predetermined face part (hereinafter, also simply referred to as a "face part") in the region corresponding to the face detected by the face detector 101a. In the present embodiment, the face part detector 101b detects a right eye, a left eye, and a mouth. These face parts are less likely to fail to be detected or less likely to be erroneously detected, as compared to face parts defining a contour such as a chin and cheeks. Note that the detection of the region corresponding to each face part can be made using a known algorithm (for example, using pattern-matching, or the like), and therefore, is not described in detail here.

The correction region setter 102 is configured to configure a first correction region and a second correction region, based on positions of the face and the face parts detected by the imaging object detector 101. In the present embodiment, the correction region setter 102 configures the first correction region and the second correction region, based on positions of the right eye, left eye, mouth detected by the imaging object detector 101. Here, the first correction region is a region of a prescribed shape located at a position corresponding to a center of the face and having a size depending on a size of the face in the input image. In the present embodiment, the first correction region is a circular region defined as a set of pixels each having a distance from a correction center c corresponding to the center of the face to be less than or equal to a first correction distance d1 depending on the size of the face. In other words, the first correction region is a region of a circle with a radius (size) of the first correction distance d1 centered at the correction center c as a center position. The second correction region is a region surrounding the first correction region in the input image, and is, for example, a circular ring region defined as a set of pixels each having a distance from the correction center c that is greater than the first correction distance d1 and less than or equal to a predetermined second correction distance d2 (d2>d1). For example, in a case that a correction is made to make the face appear smaller, the first correction region is a target to reduce, and the second correction region is a target to expand. Conversely, in a case that a correction is made to make the face appear larger, the first correction region is a target to expand, and the second correction region is a target to reduce. Note that a specific example of the correction region configuring processing performed by the correction region setter 102 will be described later with reference to another diagram.

The correction intensity setter 103 is configured to configure expansion/reduction ratios $\alpha$ and $\beta$ respectively for the first correction region and the second correction region configured by the correction region setter 102. For example, in the case that a correction is made to make the face appear smaller, the correction intensity setter 103 configures the expansion/reduction ratio $\alpha$ for the first correction region to a positive constant smaller than 1, and configures the expansion/reduction ratio $\beta$ for the second correction region to a positive constant greater than 1. Conversely, in the case that the correction is made to make the face appear larger, the correction intensity setter 103 configures the expansion/reduction ratio $\alpha$ for the first correction region to a positive constant $\alpha$ greater than 1, and configures the expansion/reduction ratio $\beta$ for the second correction region to a positive constant smaller than 1. Note that the correction intensity setter 103 may be configured to (1) configure the expansion/reduction ratios $\alpha$ and $\beta$ for the first correction region and the second correction region to values configured in advance, or (2) configure the expansion/reduction ratios $\alpha$ and $\beta$ for the first correction region and the second correction region to values specified by a user, or (3) configure the expansion/reduction ratios $\alpha$ and $\beta$ for the first correction region and the second correction region, based on the face and face parts detected by the imaging object detector 101.

The image corrector 104 is configured to perform correction processing on the first correction region and the second correction region configured by the correction region setter 102, in accordance with the expansion/reduction ratios $\alpha$ and $\beta$ configured by the correction intensity setter 103. Examples of the correction processing performed on the input image by the image corrector 104 includes (1) correction processing to reduce the first correction region configured by the correction region setter 102 with the expansion/reduction ratio $\alpha$ ($\alpha<1$) configured by the correction intensity setter 103, and expand the second correction region configured by the correction region setter 102 with the expansion/reduction ratio $\beta$ ($\beta>1$) configured by the correction intensity setter 103, and (2) correction processing to expand the first correction region configured by the correction region setter 102 with the expansion/reduction ratio $\alpha$ ($\alpha>1$) configured by the correction intensity setter 103, and reduce the second correction region configured by the correction region setter 102 with the expansion/reduction ratio $\beta$ ($\beta<1$) configured by the correction intensity setter 103. Note that a specific example of the image correction processing performed by the image corrector 104 is described later with reference to another diagram.

The storage 105 stores, for example, the input image and the output image (that is an image obtained by performing the correction processing described above on the input image). The storage 105 may store various parameters referred to by the imaging object detector 101, the correction region setter 102, the correction intensity setter 103, and the image corrector 104 in a case of performing the processing described above.

Note that, in the present embodiment, a mode is adopted in which the first correction region and the second correction region are configured based on the positions of the predetermined face parts, but an aspect of the present disclosure is not limited to this configuration. That is, a mode may be adopted in which the first correction region and the second correction region are configured based on the positions of the face parts selected from the predetermined face parts by the user. For example, in a case that the image processing device 100 includes a touch panel, the user can select a face part(s) by using the touch panel. In this case, the image processing device 100 displays the input image on the touch panel, and the user touches one or some of the face parts displayed on the touch panel. The image processing device 100 considers the face part(s) touched by the user as the face part(s) selected by the user. In a case that the display and the mouse are connected to the image processing device 100, the user can select a face part(s) by using the mouse. In this case, the image processing device 100 displays the input image on the display, and the user indicates one or some of the face parts displayed on the display by a mouse cursor. The image processing device 100 considers the face part(s) indicated by the mouse cursor as the face part(s) selected by the user.

Flow of Image Processing

Figure 3:
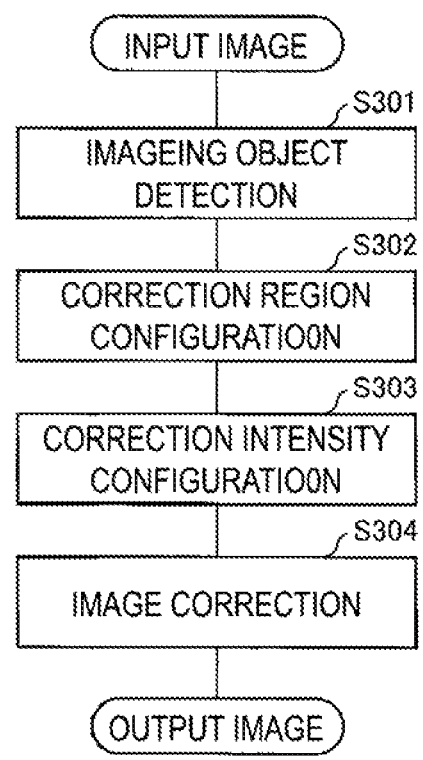
FIG. 3 is a flowchart illustrating a flow of image processing performed by the image processing device illustrated in FIG. 1.

Next, a flow of the image processing performed by the image processing device 100 will be described with reference to FIG. 3. FIG. 3 is a flowchart illustrating the flow of the image processing performed by the image processing device 100.

As illustrated in FIG. 3, the image processing performed by the image processing device 100 includes imaging object detection processing S301, correction region configuring processing S302, correction intensity configuring processing S303, and image correction processing S304.

In response to an input of the input image to the image processing device 100, the imaging object detection processing S301 is performed. The imaging object detection processing S301 is a process for detecting a face and face parts of a person included as an image in the input image, and is performed by the imaging object detector 101 in the present embodiment.

After completion of the imaging object detection processing S301, the correction region configuring processing S302 is performed. The imaging object detection processing S301 is a process for configuring the first correction region and the second correction region, based on the face and face parts detected in the imaging object detection processing S301, and is performed by the correction region setter 102 in the present embodiment.

After completion of the correction region configuring processing S302, the correction intensity configuring processing S303 is performed. The correction intensity configuring processing S303 is a process for configuring the expansion/reduction ratios α and β for the first correction region and the second correction region configured by the correction region configuring processing S302, and is performed by the correction intensity setter 103 in the present embodiment.

In a case that the correction intensity configuring processing S303 is completed, the image correction processing S304 is performed. The image correction processing S304 is a process for reducing or expanding the first correction region and the second correction region configured in the correction region configuring processing S302 with the expansion/reduction ratios α and β configured in the correction intensity configuring processing S303, and is performed by the image corrector 104 in the present embodiment.

Note that in the present embodiment, a configuration is adopted in which the imaging object detection processing S301, the correction region configuring processing S302, and the correction intensity configuring processing S303 are performed in this order, but the present disclosure is not limited to this configuration. In the correction intensity configuring processing S303, in a case that the expansion/reduction ratios are determined independently from the first correction region and the second correction region configured in the correction region configuring processing S302, the correction intensity configuring processing S303 may be performed in advance of the correction region configuring processing S302. In the correction intensity configuring processing S303, in a case that the expansion/reduction ratios are determined independently from the face and face parts detected in the imaging object detection processing S301, the correction intensity configuring processing S303 may be performed in advance of the imaging object detection processing S301. For example, in the correction intensity configuring processing S303, in a case that the expansion/reduction ratios are configured to predetermined values, the correction intensity configuring processing S303 can be performed in advance of the imaging object detection processing S301.

Specific Example of Correction Region Configuring Processing

Next, a specific example of the correction region configuring processing S302 performed by the correction region setter 102 will be described with reference to FIG. 4 and FIG. 5.

As described above, the face parts (such as cheeks, and chin) defining the facial contour are likely to fail to be detected or likely to be erroneously detected. Thus, the correction region configuring processing S302 according to the present embodiment is performed with reference to the positions of the face parts other than the face parts defining the facial contour, specifically, the positions of three face parts of the left eye, the right eye, and the mouth.

Figure 4:
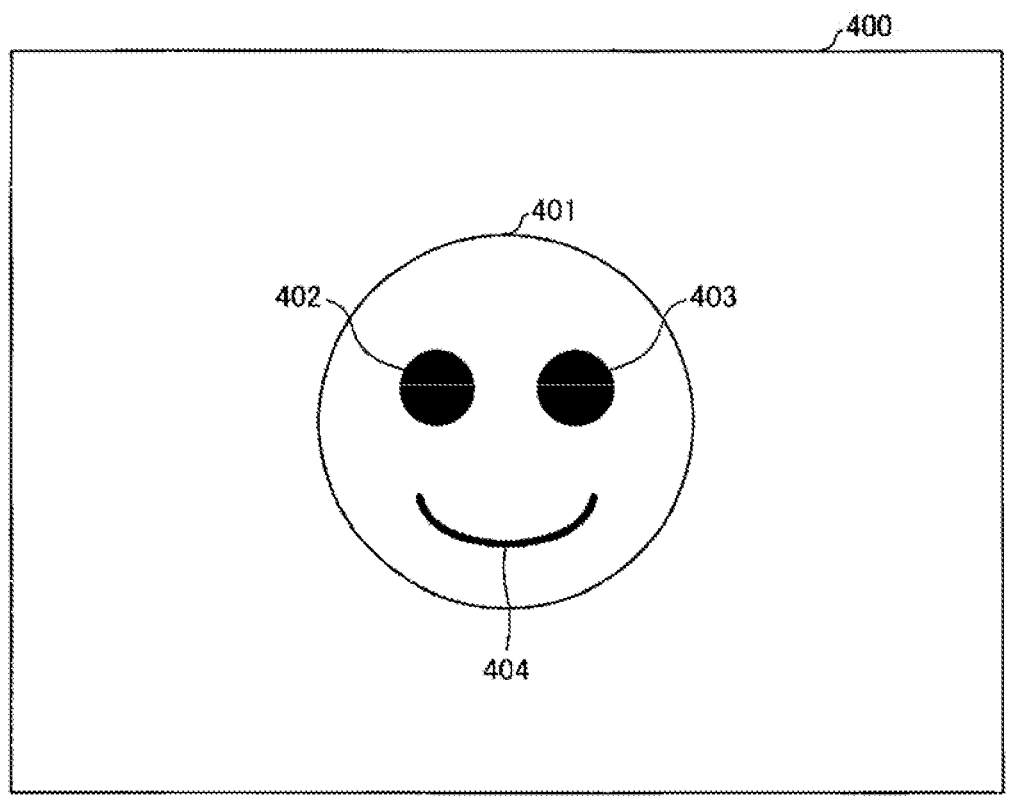
FIG. 4 is a diagram illustrating an example of an input image including a person's face as an imaging object.

FIG. 4 is a diagram illustrating an input image 400 including a person's face 401 as an imaging object. The input image 400 illustrated in FIG. 4 includes a left eye 402, a right eye 403, and a mouth 404 as imaging objects. Positions of the left eye 402, right eye 403, and mouth 404 detected by the imaging object detector 101 are respectively expressed as follows.

Position of left eye 402: (LEFT_x, LEFT_y),
Position of right eye 403: (RIGHT_x, RIGHT_y), and
Position of mouth 404: (MOUTH_x, MOUTH_y).

A center of the face 400 approximately matches a center of gravity of the left eye 402, right eye 403, and mouth 404. Thus, the correction region setter 102 calculates the correction centers c=(cx, cy) representing the center of the face from the positions of the left eye 402, right eye 403, and mouth 404 according to the following Equations (1) and (2).

$$cx = (\text{LEFT}\_x + \text{RIGHT}\_x + \text{MOUTH}\_x)/3 \quad (1)$$

$$cy = (\text{LEFT}\_y + \text{RIGHT}\_y + \text{MOUTH}\_y)/3 \quad (2)$$

A size of the face is approximately proportional to a distance dist_eye between eyes (distance between the right eye 403 and the left eye 404). Therefore, the correction region setter 102 calculates the correction distance d1 depending on the size of the face from the positions of the left eye 402 and right eye 403 according to following Equations (3) and (4).

$$\text{dist\_eye} = \{(\text{LEFT}\_x - \text{RIGHT}\_x)^2 + (\text{LEFT}\_y - \text{RIGHT}\_y)^2\}^{1/2} \quad (3)$$

$$d1 = \text{dist\_eye} \times \text{param}\_A \quad (4)$$

In Equation (4), param_A represents a proportionality factor configured in advance.

Figure 5:
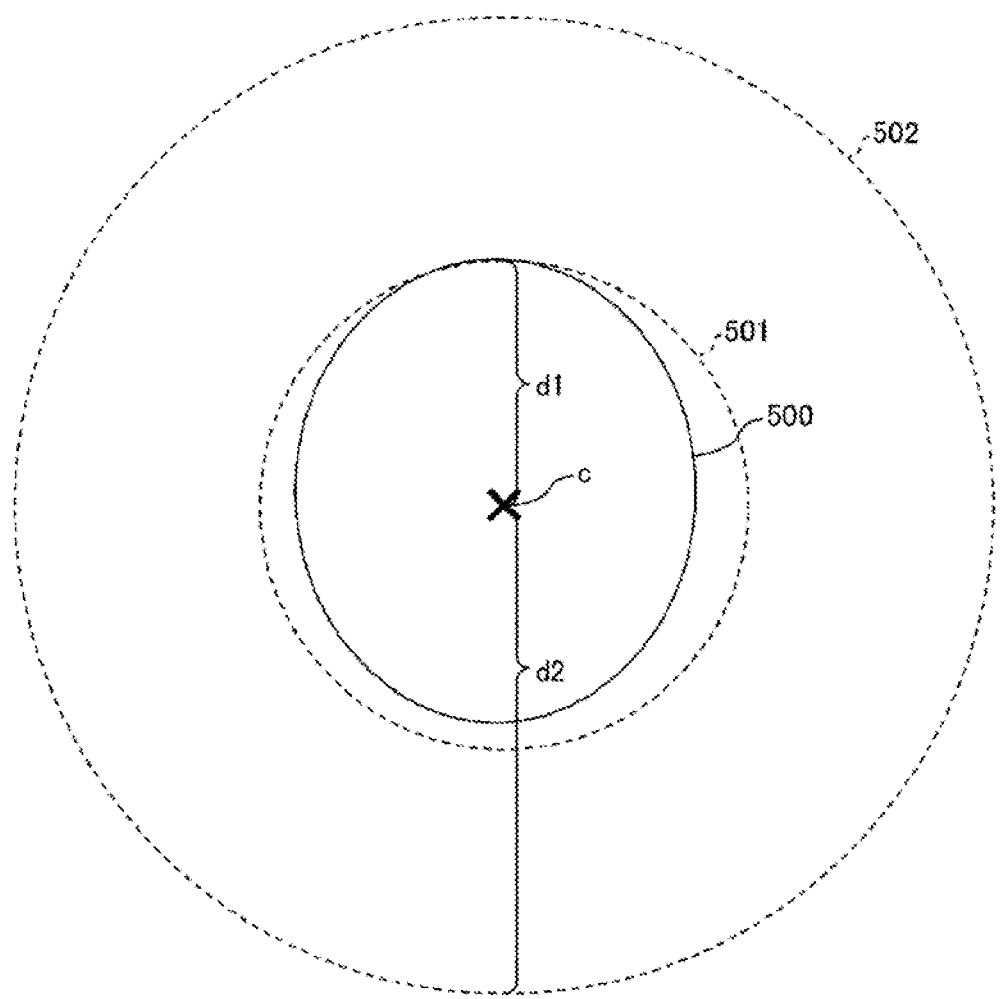
FIG. 5 is a diagram illustrating an example of a first correction region and a second correction region configured based on a right eye, a left eye, and a mouth each included as an imaging object in the input image illustrated in FIG. 4.

The correction region setter 102 configures a first correction region 501 and a second correction region 502, as illustrated in FIG. 5, by using the correction center c and the first correction distance d1 calculated as described above. Here, the first correction region 501 is a circular region defined as a set of pixels each having a distance from the correction center c that is less than or equal to the first correction distance d1. On the other hand, the second correction region 502 is a circular ring region defined as a set of pixels each having a distance from the correction center c that is greater than the first correction distance d1 and less than or equal to the second correction distance d2 (d2>d1). In the case that a correction is made to make the face appear smaller, the first correction region 501 is a target to reduce and the second correction region 502 is a target to expand. Conversely, in the case that a correction is made to make the face appear larger, the first correction region 501 is a target to expand and the second correction region 502 is a target to reduce.

The second correction distance d2 may be calculated according to Equation (5) below, for example.

$$d2 = d1 \times \mathrm{param\_B} \quad (5)$$

In Equation (5), param_B represents a predetermined proportionality factor (where param_B>1). For example, assuming that param_B=2.0, the second correction distance d2 is twice the first correction distance d1, and a width (a difference between an outer diameter and an inner diameter) of the second correction region 502 is equal to a radius of the first correction region 501.

Note that because the actual person's face is not a circle, an outer periphery of the first correction region 501 does not match a contour of a face 500. However, by appropriately configuring the factor param_A appearing in Equation (4), the contour of the face 500 can be accurately approximated from the outer periphery of the first correction region 501. In fact, there is a significant correlation between the distance between eyes and the size of the face. Thus, by measuring the ratio of the size of the face to the distance between eyes for multiple people and configuring the factor param_A to an average value of the actually measured ratios, the contour of the face 500 can be accurately approximated from the outer periphery of the first correction region 501. Note that, in a case that a person that may be an imaging object is limited to a person having a specific attribute (age, gender, or the like), a person as a sample for configuring the factor param_A as described above is preferably limited to a person having that attribute. This allows the difference between the outer periphery of the first correction region 501 and the contour of the face 500 to be smaller than a case that the sample for configuring the factor param_A is not limited.

Specific Example of Image Correction Processing

Next, a specific example of the image correction processing S304 performed by the image corrector 104 will be described with reference to FIG. 6 and FIG. 7.

The correction made to the input image in the image correction processing S304 is a correction including (1) reducing the first correction region in an isotropic manner and (2) expanding the second correction region in an isotropic manner. More specifically, this correction is to transfer a point P=(r cos θ, r sin θ)+(c1, c2), where r represents a distance from the correction center c and θ represents a direction viewed from the correction center c=(c1, c2), to (1) a point P'=(r'cos θ, r'sin θ)+(c1, c2) in a case of r≤d1, where the distance from the correction center c is r'=αr and the direction viewed from the correction center c is θ, and (2) a point P'=(r'cos θ, r'sin θ)+(c, c2) in a case of d1<r≤d2, where the distance from the correction center c is r'=βr−(β−α)d1 and the direction viewed from the correction center c is θ. Here, α represents a positive constant configured by the correction intensity setter 103 as the expansion/reduction ratio for the first correction region, and satisfies α<1. On the other hand, β represents a positive constant configured by the correction intensity setter 103 as the expansion/reduction ratio for the second correction region, defined as β=(d2−αd1)/(d2−d1), and satisfies β>1.

Figure 6:
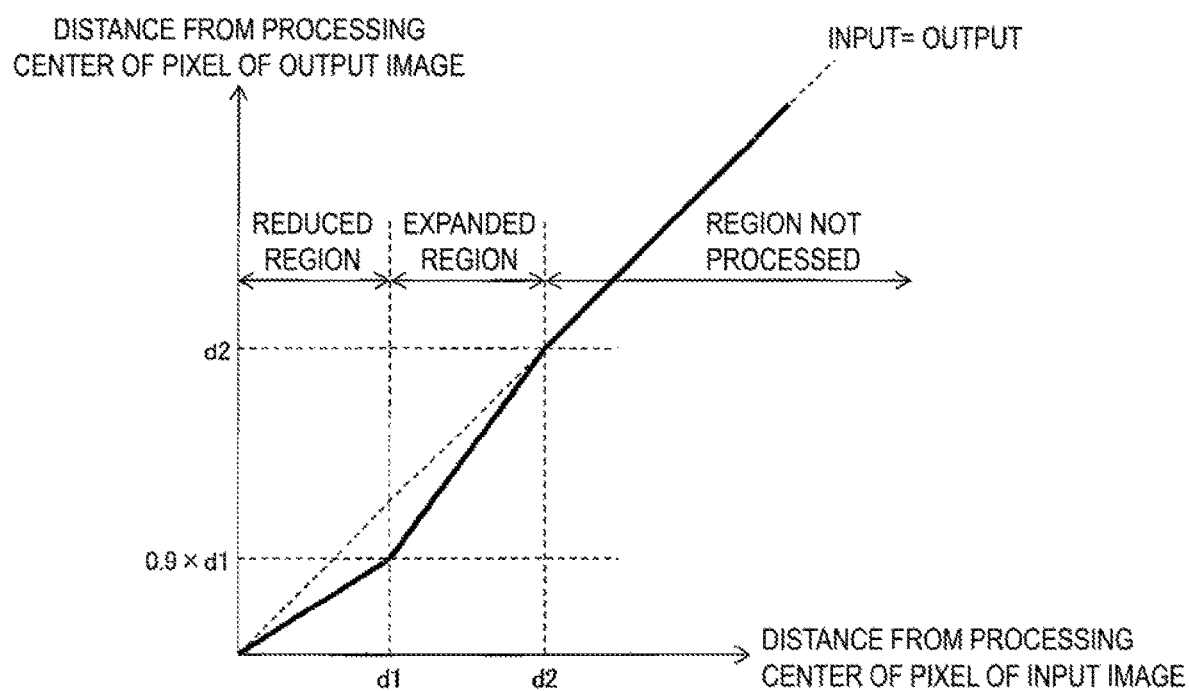
FIG. 6 is a graph illustrating a relationship between a distance r from a correction center of a pre-correction point and a distance r' from a correction center of a corrected point for image correction processing.

For example, in a case of α=0.9 and β=1.1 (d2=2d1), a relationship between the distance r from the correction center c of the pre-correction point P and the distance r' from the correction center c of the corrected point P is as a graph illustrated in FIG. 6. In this case, a displacement due to the correction is illustrated by arrows as in FIG. 7. In FIG. 7, a starting point of each arrow indicates the pre-correction point P, an ending point of the arrow indicates the corrected point P', a length of the arrow indicates a correction amount, and a direction of the arrow indicates a correction direction. As is obvious from FIG. 6 and FIG. 7, (1) a first correction region 701 (r≤d1) is reduced in an isotropic manner, (2) a second correction region 702 (d1<r≤d2) is expanded in an isotropic manner, and (3) the other region 703 (d2<r) is not changed. The second correction region 702 is expanded inward with an outer periphery being maintained, and an inner periphery of the corrected second correction region 702 matches an outer periphery of the corrected first correction region 701.

Figure 7:
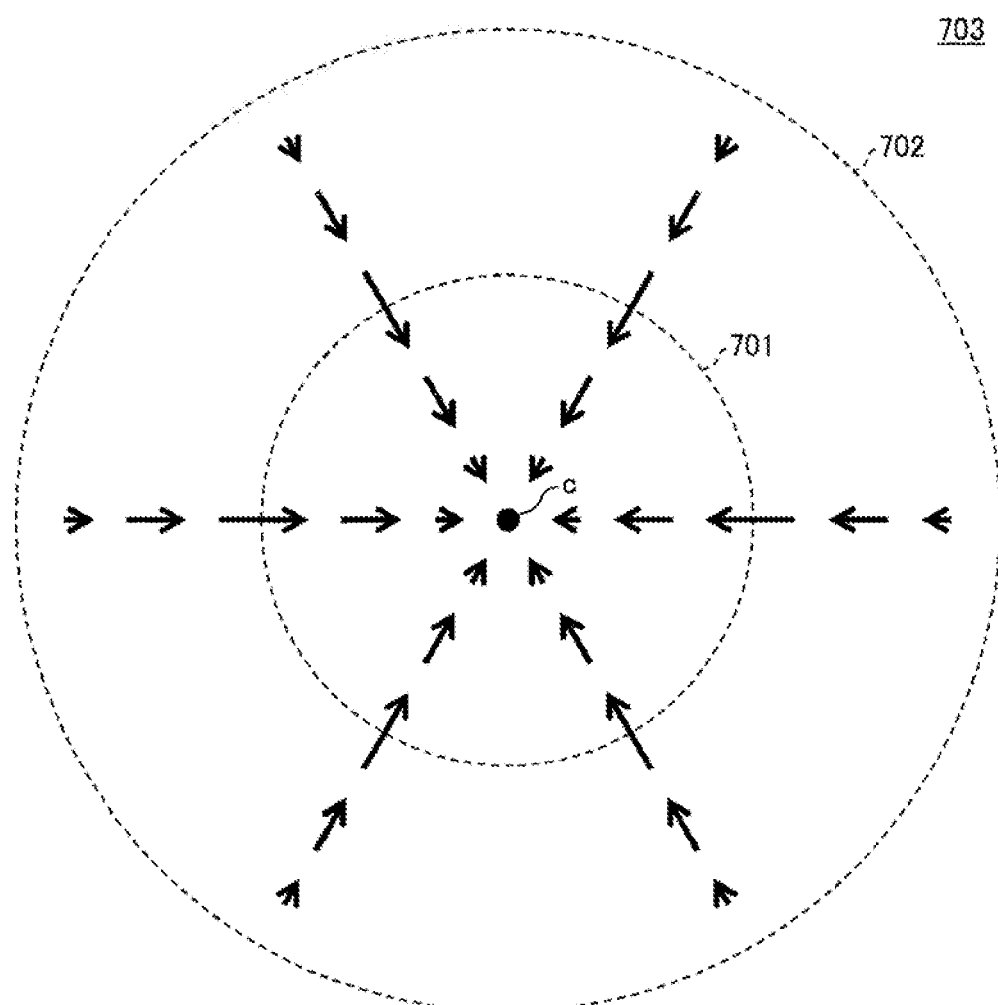
FIG. 7 is a diagram illustrating a displacement of each point due to a correction in the image correction processing as an arrow.

A first point of interest in FIG. 6 and FIG. 7 is that for the first correction region 701, the correction amount for each point P is determined depending on the distance r from the correction center c of the point P. Specifically, the correction amount for each point P is correlated to the distance r from the correction center c of that point P. Furthermore, in an aspect, the correction amount for each point P is made proportional to the distance r from the correction center c of that point P. Therefore, the correction amount in the first correction region 701 becomes smaller closer to the correction center c, and becomes larger closer to the outer periphery of the first correction region 701. As described above, the correction center c is a point that approximates the center of the face, and the outer periphery of the first correction region 701 is a circle approximating the facial contour. Thus, the correction amount becomes smaller closer to the center of the face and becomes larger closer to the facial contour. As a result, the size of the face can be sufficiently reduced while suppressing effects on the face parts (eyes, nose, mouth, and the like) near the center of the face. A second point of interest in FIG. 6 and FIG. 7 is that the second correction region 702 is expanded inwardly with the outer periphery being maintained. Therefore, even in a case that the face does not fit in the first correction region 701 but protrude into the second correction region 702 due to individual differences in a face shape, the facial contour can be moved toward the center of the face and the size of the face can be reduced.

It is sufficient that the correction region setter 102 defines the correction amount for each point P depending on the distance r from the correction center c of the point P for the first correction region 701, and as described above, the correction amount for each point P may not be proportional to the distance r from the correction center c of the point P. For example, a correspondence relationship between the correction amount for each point P and the distance r from the correction center c of the point P may be determined such that the graph illustrated in FIG. 6 is curved.

Figure 8A:
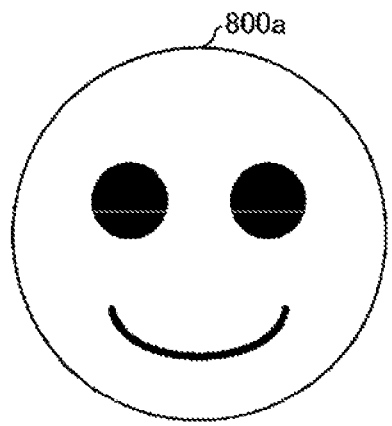
FIG. 8A is a diagram illustrating a face included as an imaging object in an input image.
Figure 8B:
FIG. 8B is a diagram illustrating another face included as an imaging object in the input image.

FIG. 8A is a diagram illustrating a face 800a included as the imaging object in the input image. A contour 805a of the face 800a is a circle. FIG. 8B is a diagram illustrating another face 800b included as the imaging object the input image. A contour 805b of the face 800b is a longitudinally long ellipse. That is, the face 800a is a round face while the face 800b is a narrow face. However, positions of the right eye, left eye, and mouth included in the face 800b correspond to positions of the right eye, left eye, and mouth included in the face 800a, respectively. Thus, the first correction region and second correction region configured based on the right eye, left eye, and mouth included in the face 800b correspond to the first correction region and second correction region configured based on the right eye, left eye, and mouth included in the face 800a, respectively.

Figure 8C:
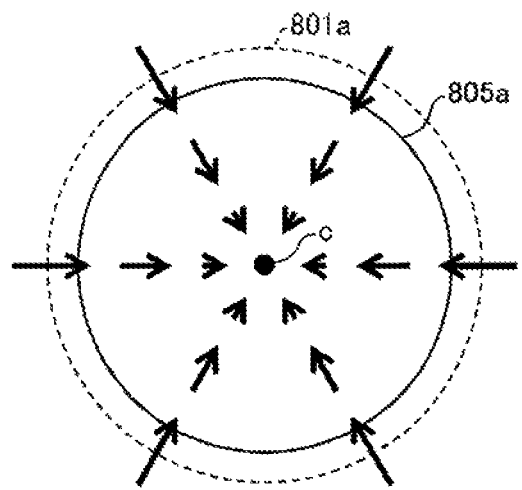
FIG. 8C is a diagram depicting an outer periphery of a first correction region configured based on a right eye, a left eye, and a mouth included in the face illustrated in FIG. 8A, along with a contour of the face illustrated in FIG. 8A.

FIG. 8C is a diagram illustrating a first correction region 801a configured based on the right eye, left eye, and mouth included in the face 800*a*, and the contour 805*a* of the face 800*a* together with arrows indicating a displacement due to the correction. In a case that the contour 805*a* of the face 800*a* is a circle, a distance from the correction center c to the contour 805*a* of the face 800*a* is constant regardless of a direction. Thus, a correction amount for the contour 805*a* of the face 800*a* is constant regardless of a direction. As a result, the contour 805*a* of the corrected face 800*a* becomes a circle, like the contour 805*a* of the pre-correction face 800*a*. That is, the corrected face 800*a* is a round face, like the pre-correction face 800*a*.

Figure 8D:
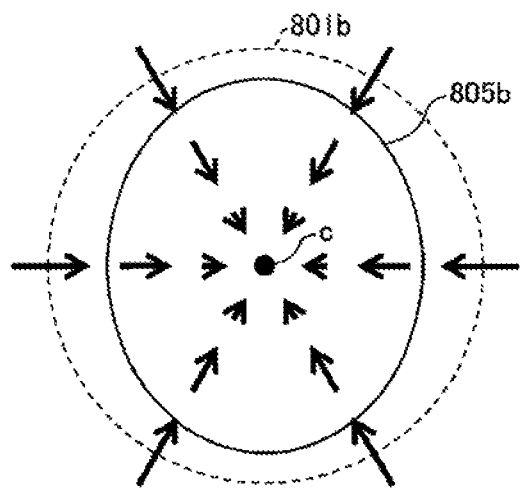
FIG. 8D is a diagram depicting an outer periphery of the first correction region configured based on a right eye, a left eye, and a mouth included in the face illustrated in FIG. 8B, together with a contour of the face illustrated in FIG. 8B. Each of arrows illustrated in FIG. 8C

FIG. 8D is a diagram illustrating a first correction region 801*b* configured based on the right eye, left eye, and mouth included in the face 800*b* and the contour 805*b* of the face 800*b* together with arrows indicating a displacement due to the correction. In a case that the contour 805*b* of the face 800*b* is a longitudinally long ellipse, a distance from the correction center c to the contour 805*b* of the face 800*b* is relatively larger in an up-down direction and relatively smaller in a right-left direction. Therefore, a correction amount for the contour 805*b* of the face 800*b* is relatively larger in the up-down direction and is relatively smaller in the right-left direction. That is, by making the correction based on the distance from the correction center, the correction amount for the narrow face is configured smaller in a lateral direction, and such configuration is preferable since the correction amount for a slender face in the lateral direction is weakened. The contour 805*b* of the corrected face 800*b* becomes closer to a circle than the contour 805*b* of the pre-correction face 800*b*. That is, the corrected face 800*b* becomes closer to a round face than the pre-correction face 800*b*.

Figure 9A:
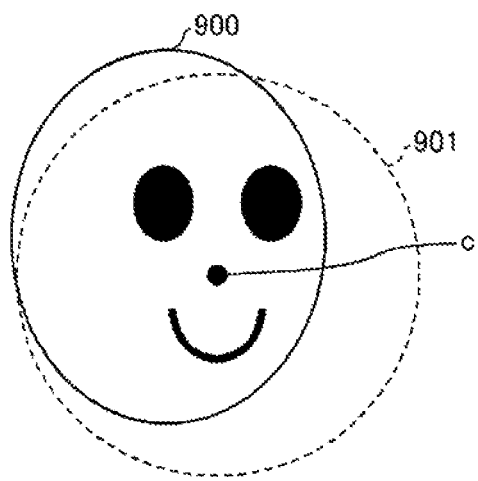
FIG. 9A is a diagram illustrating a face included as an imaging object in an input image.

Further, by determining the correction amount depending on the distance r from the correction center c, the following effects can also be obtained. FIG. 9A is a diagram illustrating the face 900 included as the imaging object in the input image. The face 900 faces to the right toward the paper surface, and a position of the face is shifted to the left with respect to the correction center c configured based on the right eye, left eye, and mouth of the face 900.

Figure 9B:
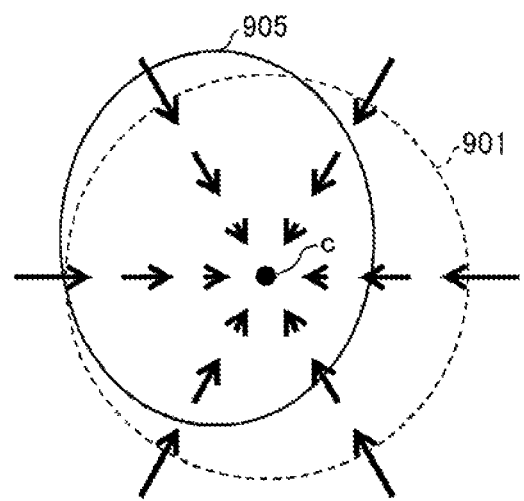
FIG. 9B is a diagram depicting an outer periphery of the first correction region configured based on a right eye, a left eye, and a mouth included in the face illustrated in FIG. 9A, together with a contour of the face illustrated in FIG. 9A. Each of arrows illustrated in FIG. 9B represents a displacement of each point due to a correction.

FIG. 9B is a diagram illustrating a first correction region 901 configured based on the right eye, left eye, and mouth included in the face 900 and a contour line 905 of the face 900 together with arrows indicating a displacement due to the correction. In a case that the face 900 faces the right toward the paper surface, the distance from the correction center c to the contour 905 of the face 900 is relatively larger on the left side than the correction center c, and is relatively smaller on the right side than the correction center c. Therefore, a correction amount for the contour 905 of the face 900 is relatively larger on the left side than the correction center c, and is relatively smaller on the right side than the correction center c. Therefore, a correction amount on the right side of the face that is captured on the image with being reduced is smaller as compared with a case that the image is captured with the face facing the front, and conversely, a correction amount on the left side of the face that is captured on the image with being expanded is larger as compared with the case that the image is captured with the face facing the front, so that the correction is made in a balanced manner on the right and left sides of the face to give a preferable corrected image.

Supplemental Note

As described above, in the present embodiment, the first correction region as a target to reduce (or a target to expand) and the second correction region as a target to expand (or a target to reduce) are configured based on the correction center c representing the center of the face and the correction distance d1 representing the size of the face. The center of face and the size of the face can be identified without referring to the positions of the face parts defining the facial contour, such as cheeks and chin. Indeed, in the present embodiment, the correction center c representing the center of the face is identified by referring to the positions of the right eye, left eye, and mouth, and the correction distance d1 representing the size of the face is identified by referring to the positions of the right eye and left eye. The left eye, the right eye, and the mouth are less likely to fail to be detected or less likely to be erroneously detected as compared to the face parts defining the facial contours. Accordingly, in the image processing device 100 according to the embodiment, a correction is less likely to be impossible or a correction is less likely to be inappropriate as compared with the image processing device in the related art that requires detection of the face parts defining the facial contour.

Note that in the present embodiment, the right eye, the left eye, and the mouth are used as the face parts referred to for identifying the center of the face and the size of the face, but an aspect of the present disclosure is not limited thereto. That is, the same effects as the image processing device 100 according to the present embodiment can be obtained by using the face parts other than the face parts defining the facial contour, as the face parts referred to for identifying the center of the face and the size of the face. Examples of the face parts other than the face parts defining the facial contour include a right eyebrow, a left eyebrow, and a nose, in addition to the right eye, the left eye, and the mouth.

Figure 17:
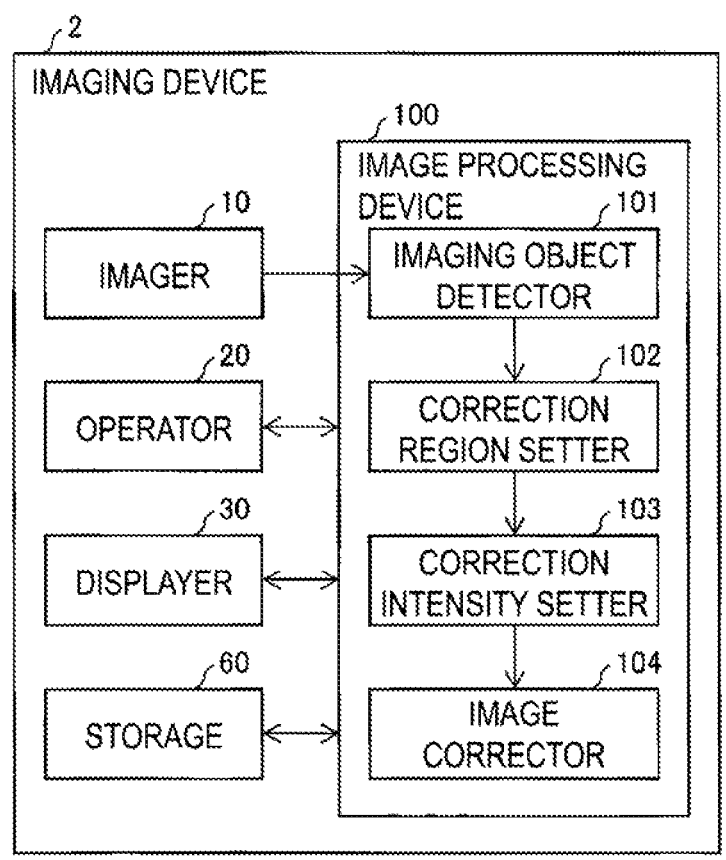
FIG. 17 is a block diagram illustrating a configuration of an image capturing device according to an embodiment of the present disclosure.

Another aspect of the present embodiment may be an image capturing device that does not have a printing function. FIG. 17 is a schematic block diagram illustrating a configuration of an imaging device 2 according to another aspect of the present embodiment. Similar to the image printing device 1, the imaging device 2 includes an imager 10, an operator 20, a displayer 30, a controller 100 (image processing device), and a storage 60, but does not include a printer 50.

Figure 18A:
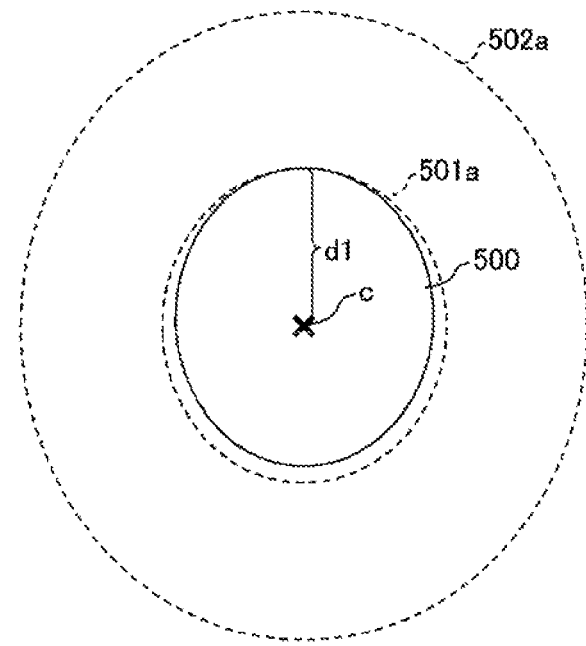
FIGS. 18A and 18B are diagrams illustrating other examples of the first correction region and the second correction region.
Figure 18B:
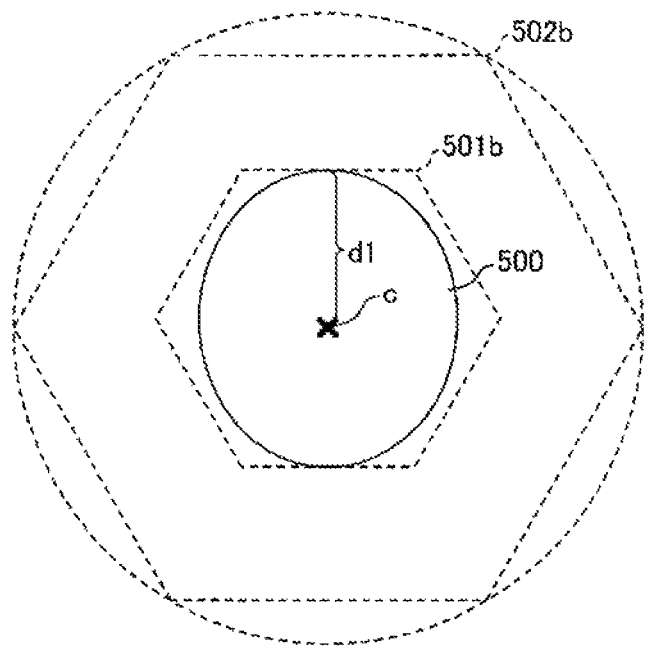

As described above, in the present embodiment, a shape of a first correction region is not limited to a circle. That is, the first correction region may be a region of a prescribed shape located at a position corresponding to the center of the face and having a size depending on the size of the face, and the prescribed shape may be an ellipse, a polygon, or the like, besides a circle. A shape of a second correction region is also not limited to a circle, and may be an ellipse, a polygon, or the like. FIG. 18A is a diagram illustrating an example of a first correction region 501*a* and a second correction region 502*a* in a case that the prescribed shape is an ellipse. FIG. 18B is a diagram illustrating an example of the first correction region 501*a* and the second correction region 502*b* in a case that the prescribed shape is a polygon.

As illustrated in FIG. 18A, in a case that the prescribed shape is an ellipse, the first correction region 501*a* may be a region of an ellipse with a major radius (size) of the first correction distance d1 centered at the correction center c as the center position, for example. An ellipticity is not particularly limited, and a predetermined value may be used. As illustrated in FIG. 18B, in a case that a prescribed shape is a polygon, the first correction region 501*b* is, for example, a region of a hexagon having the correction center c as the center (center of gravity) position and the first correction distance d1 as a longitudinal width (size). The type of the polygon is not particularly limited, and other polygons (triangle, square, pentagon, octagon, or the like) may be used instead of a hexagon.

As described above, in a case that the shape of the first correction region and second correction region is a shape other than a circle, the correction made to the input image in the image correction processing S304 is as follows. Specifically, assuming that a distance from the correction center c to the outer periphery of the first correction region is $d1(\theta)$ and a distance from the correction center c to the outer periphery of the second correction region is $d2(\theta)$, where $\theta$ represents a direction viewed from the correction center c, this correction is to transfer a point $P=(r\cos\theta, r\sin\theta)+(c1, c2)$, where r represents a distance from the correction center c and $\theta$ represents a direction viewed from the correction center $c=(c1, c2)$, to (1) a point $P'=(r'\cos\theta, r'\sin\theta)+(c1, c2)$ in a case of $r \leq d1(\theta)$, where the distance from the correction center c is $r'=\alpha r$ and the direction viewed from the correction center c is $\theta$, and (2) a point $P'=(r'\cos\theta, r'\sin\theta)+(c1, c2)$ in a case of $d1(\theta)<r\leq d2(\theta)$, where the distance from the correction center c is $r'=\beta r-(\beta-\alpha)d1(\theta)$ and the direction viewed from the correction center c is $\theta$. Here, $\alpha$ represents a positive constant configured by the correction intensity setter 103 as the expansion/reduction ratio for the first correction region, and satisfies $\alpha<1$. On the other hand, $\beta$ represents a positive constant configured by the correction intensity setter 103 as the expansion/reduction ratio for the second correction region, defined as $\beta=(d2(\theta)-\alpha d1(\theta))/(d2(\theta)-d1(\theta))$, and satisfies $\beta>1$.

As described above, the shape of each of the first correction region and the second correction region may be a shape other than a circle, and in this case, $d1(\theta)$ defined for each angle $\theta$ depending on the shape of the first correction region may be used for the first correction distance which is used in a case of performing the image correction processing, and $d2(\theta)$ defined for each angle $\theta$ depending on the shape of the second correction region may be used for the second correction distance. This is also applied to the following embodiments.

Second Embodiment

An image processing device 100 according to a second embodiment of the present disclosure will be described with reference to FIG. 10A to FIG. 12. The image processing device 100 according to the first embodiment adopts the configuration in which the first correction region is reduced in an isotropic manner with the expansion/reduction ratio $\alpha$ which is direction-independent, whereas the image processing device 100 according to the present embodiment adopts a configuration in which the first correction region is reduced in a non-isotropic manner with an expansion/reduction ratio $\alpha(\theta)$ which is direction-dependent. Here, $\theta$ represents a direction viewed from the correction center c, where $\theta=0$ in a right direction of the input image, $\theta=\pi/2$ in an upper direction of the input image, $\theta=\pi$ in a left direction of the input image, and $\theta=3\pi/2$ in a lower direction of the input image (in units of radians).

Figure 10A:
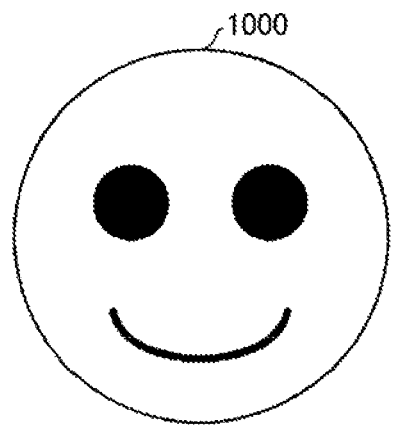
FIG. 10A is a diagram illustrating a pre-correction face included as an imaging object in an input image.
Figure 10B:
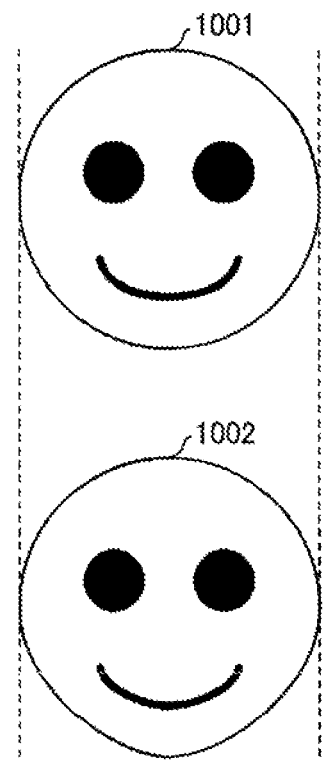
FIG. 10B is a diagram illustrating a corrected face included as an imaging object in an output image.

FIG. 10A is a diagram illustrating a pre-correction face 1000 included as an imaging object in an input image, and FIG. 10B is a diagram illustrating corrected faces 1001 and 1002 included as imaging objects in an output image. In FIG. 10B, the corrected face 1001 is a face included as an imaging object in the output image obtained by the image processing device 100 according to the first embodiment, that is, a face obtained in a case that the pre-correction face 1000 is reduced in an isotropic manner, and the corrected face 1002 is a face included as an imaging object in the output image obtained by the image processing device according to the present embodiment, that is, a face obtained in a case that the pre-correction face 1000 is reduced in a non-isotropic manner. In the correction by the image processing device 100 according to the present embodiment, the expansion/reduction ratios $\alpha(\theta)$ in respective directions are configured such that a correction amount in the upper direction of the face 1000 is relatively small, correction amounts in a lower right direction and lower left direction of the face 1000 are relatively large, and correction amounts in the right direction, left direction, and lower direction of the face 1000 are moderate. Thus, the corrected face 1002 is sharper in terms of lines from the cheeks to the chin than the pre-correction face 1000. Note that in a case that the face 1000 included as an imaging object in the input image is inclined, the up-down and left-right directions of the input image and the up-down and left-right directions of the face 1000 do not match. Therefore, in the present embodiment, the expansion/contraction $\alpha(\theta)$ in each direction is configured in consideration of the inclination of the face 1000 in the input image.

The image processing device 100 according to the present embodiment can be implemented by, for example, adding the following modifications to the image processing device 100 according to the first embodiment.

Modification 1: Add a function of calculating an inclination $\theta\_f$ of the face from the positions of the face parts (specifically, the right eye and the left eye) to the correction intensity setter (estimator) 103.

Modification 2: In the correction intensity setter 103, a function of configuring the direction-independent expansion/reduction ratios $\alpha$ and $\beta$ is replaced with a function of configuring the direction-dependent expansion/reduction ratios $\alpha(\theta)$ and $\beta(\theta)$.

Modification 3: In the image corrector 104, the function of reducing the first correction region with the direction-independent expansion/reduction ratio $\alpha$ in an isotropic manner and expanding the second correction region with the direction-independent ratio $\beta$ in an isotropic manner is replaced with a function of reducing the first correction region with the direction-dependent expansion/reduction ratio $\alpha(\theta)$ in a non-isotropic manner and expanding the second correction region with the direction-dependent expansion/decrease ratio $\beta(\theta)$ in a non-isotropic manner.

First, a method for calculating the inclination $\theta\_f$ of the face from the positions of the right eye and left eye will be described with reference to FIG. 11.

Figure 11:
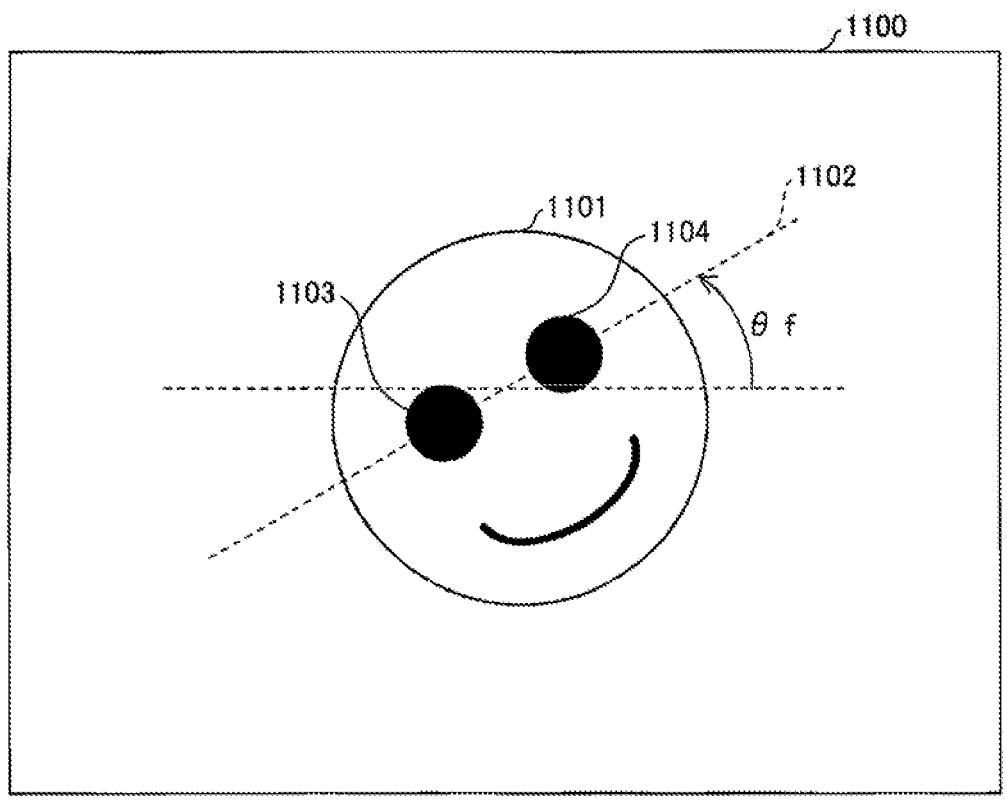
FIG. 11 is a diagram illustrating an example of an input image including a person's face as an imaging object.

FIG. 11 is a diagram illustrating an input image 1100 including a person's face 1101 as an imaging object. The inclination $\theta\_f$ of the face is defined as an angle formed by an x-axis (horizontal axis) of the input image 1100 and a straight line 1102 connecting the left and right eyes. Assuming that a position of a left eye 1103 is (LEFT_x, LEFT_y) and a position of a right eye 1104 is (RIGHT_x, RIGHT_y), the inclination $\theta\_f$ of the face can be calculated according to Equation (6) below.

$$\theta\_f=\arctan((RIGHT\_y-LEFT\_y)/RIGHT\_x-LEFT\_x) \quad (6)$$

Next, a method for configuring the expansion/reduction ratios $\alpha(\theta)$ and $\beta(\theta)$ depending on the direction viewed from the correction center c will be described with reference to FIG. 12.

In a case that the inclination $\theta\_f$ of the face is used, the direction $\theta$ from the correction center c (where the right direction of the image is $\theta=0$, the upper direction of the image is $\theta=\pi/2$, the left direction of the image is $\theta=\pi$, and the lower direction of the image is $\theta=3\pi/2$) can be associated with the direction of the face. Specifically, the direction $\theta=\theta\_f$ is the right direction of the face, the direction $\theta=\theta\_f+$ π/2 is the upward direction of the face, the direction $\theta=\theta\_f+\pi$ is the left direction of the face, and the direction $\theta=\theta\_f+3\pi/2$ is the lower direction of the face (in units of radians).

The expansion/reduction ratio $\alpha(\theta)$ for the first correction region can be configured in accordance with $\alpha(\theta)=1-(1-a)\gamma(\theta)$, for example. Here, a represents a constant direction-independent which is introduced in the first embodiment, and $\gamma(\theta)$ represents a coefficient direction-dependent which is introduced in the present embodiment. FIG. 12 is a graph illustrating an example of the coefficient $\gamma(\theta)$. In FIG. 12, a horizontal axis represents the direction $\theta$ viewed from the correction center c, and a vertical axis represents the coefficient $\gamma(\theta)$. For example, in a case of $\alpha=0.9$, (1) $\alpha(\theta)=0.95$ because of $\gamma(\theta)=0.5$ at $\theta=\theta\_f$ (in the right direction of the face), (2) $\alpha(\theta)=1$ because of $\gamma(\theta)=0$ at $\theta=\theta\_f+\pi/2$ (in the upper direction of the face), (3) $\alpha(\theta)=0.95$ because of $\gamma(\theta)=0.5$ at $\theta=\theta\_f+\pi$ (in the left direction of the face), and (4) $\alpha(\theta)=0.95$ because of $\gamma(\theta)=0.5$ at $\theta=\theta\_f+3\pi/2$. Furthermore, $\alpha(\theta)=0.9$ because of $\gamma(\theta)=1$ at $\theta=\theta\_f+5\pi/4$ (in the lower left of the face) and $\theta=\theta\_f+7\pi/4$ (in the lower right of the face). Specifically, in a case that the coefficient $\gamma(\theta)$ is configured as illustrated in FIG. 12, the correction amount in the upper direction of the face is the smallest, the correction amounts in the lateral direction and lower direction of the face are moderate, and the correction amount in a diagonal lower direction of the face is the largest. The expansion/reduction ratio $\beta(\theta)$ for the second correction region may be configured in accordance with $\beta(\theta)=(d2-\alpha(\theta)d1)/(d2-d1)$, similarly to the first embodiment.

The correction processing by the image corrector 104 is implemented by, similarly to the first embodiment, transferring a point $P=(r\cos\theta, r\sin\theta)+(c1, c2)$, where r represents a distance from the correction center c and $\theta$ represents a direction viewed from the correction center $c=(c1, c2)$, to (1) a point $P'=(r'\cos\theta, r'\sin\theta)+(c1, c2)$ in a case of $r\leq d1$, where the distance from the correction center c is $r'=\alpha(\theta)r$ and the direction viewed from the correction center c is $\theta$, and (2) a point $P'=(r'\cos\theta, r'\sin\theta)+(c1, c2)$ in a case of $d1<r\leq d2$, where the distance from the correction center c is $r'=\beta(\theta)r-(\beta(\theta)-\alpha(\theta))d1$ and the direction viewed from the correction center c is $\theta$. In a case that the expansion/reduction ratios $\alpha(\theta)$ and $\beta(\theta)$ for respective directions are configured as described above, the corrected face 1002 is sharper in terms of lines from the cheeks to chin than the pre-correction face 1000, as illustrated in FIG. 10.

As described above, in the present embodiment, the first correction region on the input image including the face as an imaging object is corrected to be reduced with the direction-dependent expansion/reduction ratio $\alpha(\theta)$ in a non-isotropic manner. Therefore, by appropriately configuring the expansion/reduction ratio $\alpha(\theta)$, a correction can be made to bring the face closer to a desired shape, such as a sharp face in terms of lines from the cheeks to the chin of the face. In the present embodiment, the inclination $\theta\_f$ of the face included in the input image is identified, and the expansion/reduction ratio $\alpha(\theta)$ is configured depending on the identified face inclination $\theta\_f$. Thus, even in a case that a face included as an imaging object in an input image is inclined, a correction can be made to bring the face closer to a desired shape.

Third Embodiment

Figure 13:
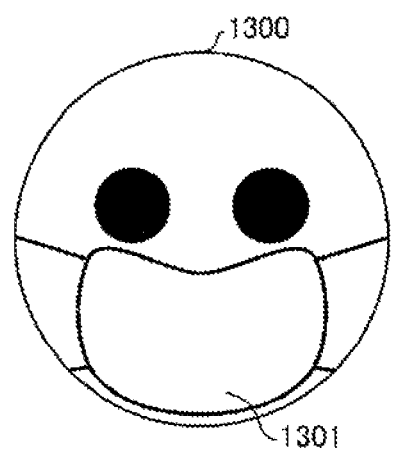
FIG. 13 is a diagram illustrating a face included as an imaging object in an input image.

An image processing device 100 according to a third embodiment of the present disclosure will be described with reference to FIG. 13 to FIG. 14. The image processing device 100 according to the first embodiment adopts the configuration in which the first correction region and the second correction region are configured based on the positions of predetermined face parts (specifically, a right eye, a left eye, and a mouth), whereas the image processing device 100 according to the present embodiment adopts a configuration in which the first correction region and the second correction region are configured based on positions of face parts that are successfully detected, among predetermined face parts (specifically, a right eye, a left eye, and a mouth).

The right eye, the left eye, and the mouth which are the targets to detect for the image processing device 100 according to the first embodiment are less likely to fail to be detected as compared with the cheeks, chin, and the like which are targets to detect for the image processing device in the related art. However, for example, in a case that an input image including a face 1300 wearing a mask 1301 as an imaging object is provided as illustrated in FIG. 13, a position of a mouth covered by the mask 1301 cannot be detected from the input image. The image processing device 100 according to the first embodiment cannot correct the input image in a case that the mouth fails to be detected.

This is because the position of the mouth is required for the configuration of the first correction region and the second correction region. In contrast, the image processing device 100 according to the present embodiment can correct the input image even in a case that the mouth fails to be detected. This is because, in the case that the mouth fails to be detected, the first correction region and the second correction region are configured based on the positions of the right eye and left eye.

The image processing device 100 according to the present embodiment can be implemented by, for example, adding the following modifications to the image processing device 100 according to the first embodiment.

Modification 1: Add, to the correction region setter 102, a function of configuring the first correction region and the second correction region, based on the positions of the right eye and left eye. This allows the correction region setter 102 to have both the function of configuring the first correction region and the second correction region, based on the positions of the right eye, left eye, and mouth, and a function of configuring the first correction region and the second correction region, based on the positions of the right eye and left eye.

Modification 2: Add, to the correction region setter 102, a configuration to switch between the functions used for configuring the first correction region and the second correction region depending on whether or not the mouth is successfully detected. With this configuration, in a case that the mouth is successfully detected, the correction region setter 102 configures the first correction region and the second correction region, based on the positions of the right eye, left eye, and mouth, and in a case that the mouth fails to be detected, the correction region setter 102 configures the first correction region and the second correction region, based on the positions of the right eye and left eye.

The function of configuring the first correction region and the second correction region, based on the positions of the right eye, left eye, and mouth can be achieved by the method described in the first embodiment. On the other hand, the function of configuring the first correction region and the second correction region, based on the positions of the right eye and left eye can be achieved by a method described below.

Figure 14:
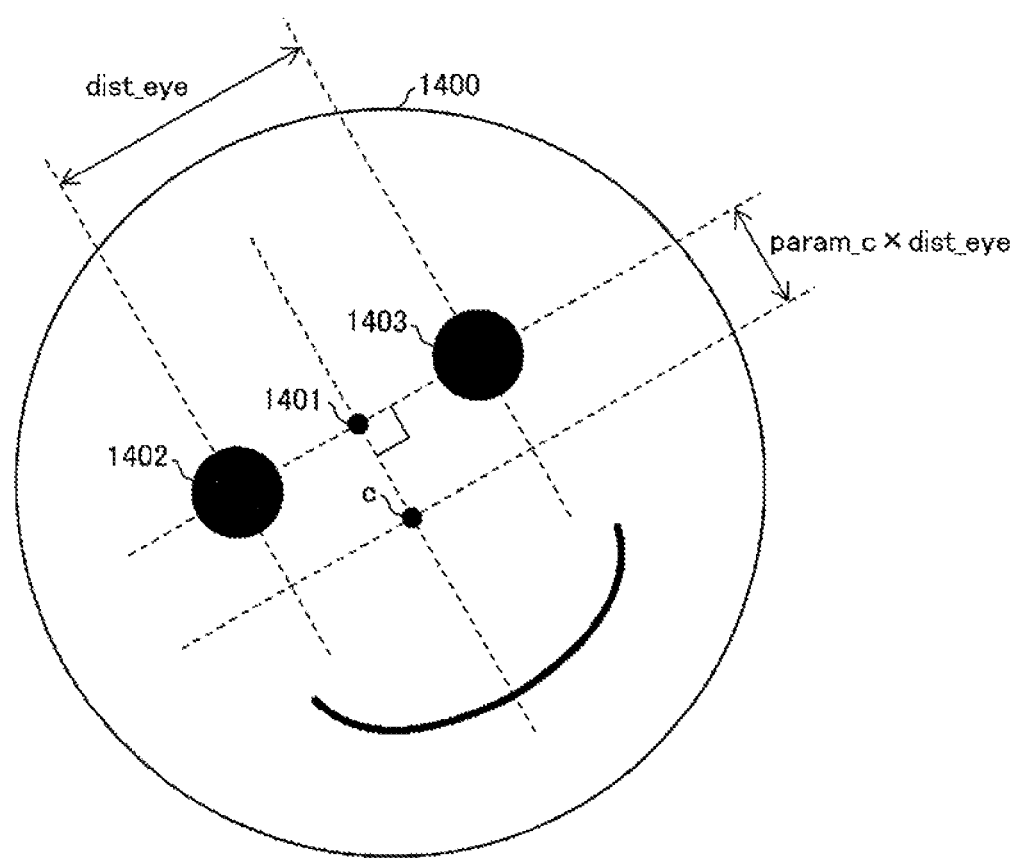
FIG. 14 is a diagram illustrating a face included as an imaging object in an input image.

FIG. 14 is a diagram illustrating a face 1400 included as an imaging object in an input image. The input image includes a left eye 1402 and a right eye 1403 as imaging objects. Positions of the left eye 1402 and right eye 1403 detected by the imaging object detector 101 are respectively expressed as follows.

Position of left eye 1402: (LEFT_x, LEFT_y), and
Position of right eye 1403: (RIGHT_x, RIGHT_y).

A center of the face 1400 can be approximated by a point which is obtained by moving a midpoint 1401 between the left eye 1402 and the right eye 1403 by a length of param_c times a distance dist_eye between both sides in a direction perpendicular to a straight line connecting the left eye 1402 and the right eye 1403 (a direction toward a mouse). Thus, the correction region setter 102 calculates the correction center c=(cx, cy) representing the center of the face in accordance with the following Equations (7) and (8).

$$cx=(LEFT\_x+RIGHT\_x)/2-(RIGHT\_y-LEFT\_y)\times param\_c \quad (7)$$

$$cy=(LEFT\_y+RIGHT\_y)/2-(LEFT\_x-RIGHT\_x)\times param\_c \quad (8)$$

There is a significant correlation between the distance between eyes and the distance from the midpoint between eyes to the center of the face. Therefore, the correction center c accurately approximating the center of the face can be calculated by actually measuring a ratio of the distance from the midpoint between both sides to the center of the face to the distance between eyes for multiple peoples, and configuring an average value of the actually measured ratios to the factor param_c.

The correction region setter 102 configures the first correction region and the second correction region by using the correction center c calculated as described above, and the first correction distance d1 calculated in accordance with Equations (3) and (4) similarly to the first embodiment.

Here, the mode is described in which the first correction region and the second correction region are configured based on the positions of the right eye and left eye in the case that the position of the mouth cannot be detected. However, the present embodiment is not limited thereto. Specifically, the present embodiment also includes a mode in which the first correction region and the second correction region are configured based on the positions of the left eye and mouth in a case that the position of the right eye cannot be detected, or a mode in which the first correction region and the second correction region are configured based on the positions of the right eye and mouth in a case that the position of the left eye cannot be detected. The present embodiment further includes a mode combining these functions, that is, a mode in which the first correction region and the second correction region are configured, in a case that any one of face parts including the right eye, the left eye, and the mouth fails to be detected, based on the positions of remaining two face parts successfully detected.

Although the mode using the right eye, the left eye, and the mouth as the targets to detect is described here, but the present embodiment is not limited thereto. Specifically, the present embodiment embraces also a mode using the face parts other than the above face parts as the targets to detect, for example, a mode using a right eye, a left eye, and a nose as detection candidates, or a mode using a right ear, a left ear, and a mouth as the targets to detect. Examples of the face parts that may substitute for the left and right eyes include left and right cheeks, left and right eyebrows (eyebrows), and the like in addition to the left and right ears. Examples of the face parts that may substitute for the mouth include a chin, a crown, and the like in addition to the nose. In the present embodiment, even in a case that a certain face part fails to be detected, the first correction region and the second correction region can be configured based on other face parts. Thus, the face parts likely to fail to be detected (such as an ear, a cheek, a chin, a crown, and the like) which define the facial contour can also be used as the targets to detect. A position of an inner or outer corner of a right or left eye may be added to the detection candidate, or a position of a right or left corner of a mouth may be added to the detection candidate. In other words, the position of each portion of each face part can also be added to the target to detect.

As described above, in the present embodiment, the first correction region and the second correction region are configured based on the positions of the face parts successfully detected (for example, a right eye and a left eye) among predetermined face parts (for example, a right eye, a left eye, and a mouth). Accordingly, it is possible to configure the first correction region and the second correction region even in a case that some (for example, a mouth) of the predetermined face parts fail to be detected.

Fourth Embodiment

An image processing device 100 according to a fourth embodiment of the present disclosure will be described with reference to FIG. 15A to FIG. 16B. The image processing device 100 according to the present embodiment adopts the configuration in which the first correction region is reduced in a non-isotropic manner with the direction-dependent expansion/reduction ratio α(θ) as in the image processing device 100 according to the second embodiment, and the configuration in which the first correction region and the second correction region are configured based on the positions of the face parts that are successfully detected, among the predetermined face parts (specifically, a right eye, a left eye, and a mouth) as in the image processing device 100 according to the third embodiment.

Figure 15E:
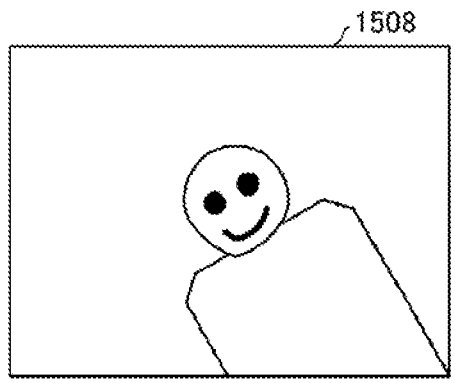
Figure 16A:
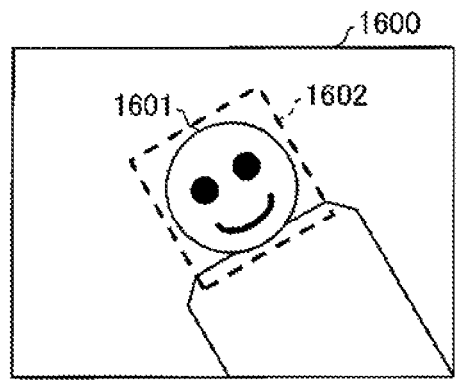
FIGS. 16A and 16B are diagrams respectively illustrating a face included as an imaging object in the input image and a corrected image.
Figure 16B:
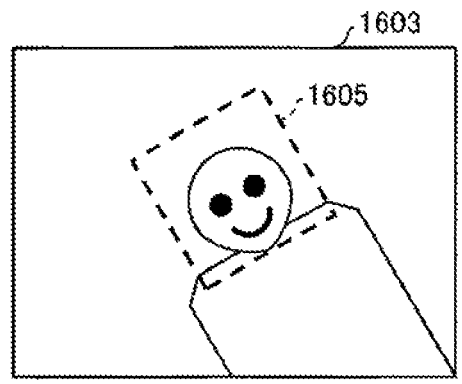

At this time, in the configuration in which the first correction region and the second correction region are configured based on the positions of the face parts successfully detected, the correction intensity setter 103 may not be able to estimate the inclination of the face depending on a combination of the face parts successfully detected. In such a case, the image corrector 104, configured to always reduce the first correction region in a non-isotropic manner, may cause an unnatural correction, for example, as illustrated in FIG. 15E. In contrast, the image processing device 100 according to the present embodiment can achieve such an effect that in a case that the inclination of the face cannot be estimated, the first correction region is reduced in an isotropic manner as illustrated in FIG. 16A to avoid an unnatural correction, and in a case that the inclination of the face can be estimated, the first correction region is reduced in a non-isotropic manner as illustrated in FIG. 16B to sharpen a chin line.

The image processing device 100 according to the present embodiment can be implemented by, for example, adding the following modifications to the image processing device 100 according to the second embodiment.

Modification 1: Add, to the correction intensity setter 103, a function of configuring the first correction region and the second correction region, based on the positions of the face parts successfully detected, as in the image processing device 100 according to the third embodiment. This allows the first correction region and the second correction region to be configured based on the positions of the face parts successfully detected even in the case that some of the face parts fail to be detected.

Modification 2: Add, to the correction intensity setter 103, a function of determining whether or not the inclination θ_f of the face parts can be calculated from the positions of the face parts successfully detected, and configuring the direction-independent expansion/reduction ratios α and β in a case that the inclination θ_f of the face cannot be calculated, and configuring the direction-dependent expansion/reduction ratios α(θ) and β(θ) in a case that the inclination θ_f of the face can be calculated. This makes is possible to switch whether or not the first correction region is reduced in a non-isotropic manner depending on whether or not the inclination of the face can be estimated.

Figure 15A:
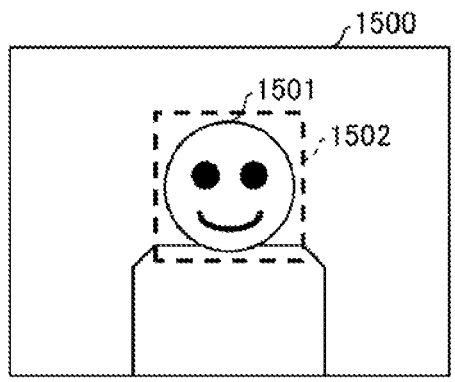
FIGS. 15A to 15E are diagrams each illustrating a face included as an imaging object in an input image or a corrected image.
Figure 15B:
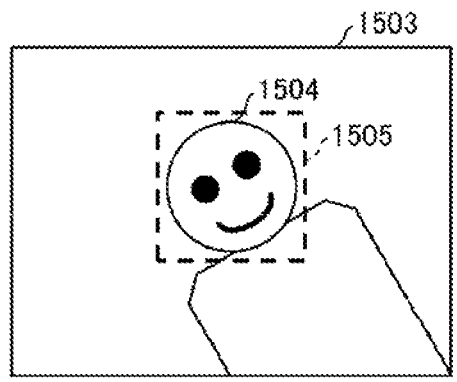

FIG. 15A illustrates an input image 1500, and a face 1501 of a person is captured. A region indicated by a dashed rectangular frame is a face region 1502, indicating a state that only the face region is detected and the face parts is not detected yet. FIG. 15B illustrates an input image 1503, and a face 1504 of a person is captured. A region indicated by a dashed rectangular frame is a face region 1505, indicating a state that only the face region is detected and the face parts is not detected yet. As illustrated in FIGS. 15A and 15B, the face 1501 and the face 1504 differ in the inclination of the face with respect to the vertical and horizontal directions of the image. In a case that the face region is detected as a rectangular region parallel to the horizontal and vertical directions of the image, the inclination of the face cannot be calculated from the rectangular face region. On the other hand, in a case of not being shifted greatly from a position of the detected face region, the center of the rectangular face region can be configured as the correction center for performing the correction processing. In a case that the face region is detected in a size such that the face region substantially circumscribes the contour of the face, the face region can be configured as a correction region, based on the size of the rectangle. Assuming that a horizontal width of the rectangle is rect_x and a vertical width is rect_y, d1 can be configured, for example, by the following equation.

$$d1 = (rect\_x + rect\_y)/4 \quad (9)$$

Figure 15C:
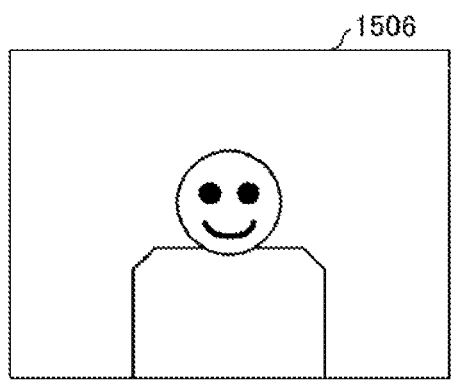
Figure 15D:
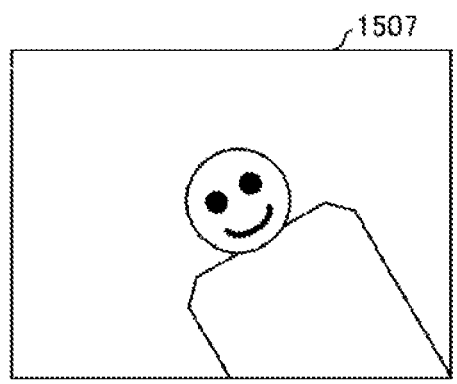

As illustrated in FIGS. 15A and 15B, in a case that the center position of the face and the size of the face can be estimated from the information of the face region and face parts detected from the image, but the inclination of the face cannot be estimated, the correction center and a range of the correction region are configured, and the face is corrected with a constant correction amount regardless of the angle from the correction center. FIGS. 15C and 15D respectively illustrate an image 1506 and an image 1507 obtained by correcting the face 1501 and the face 1504 illustrated in FIGS. 15A and 15B with an isotropic correction amount. By correcting the face with the isotropic correction amount, the entire face is corrected to be small.

Figure 12:
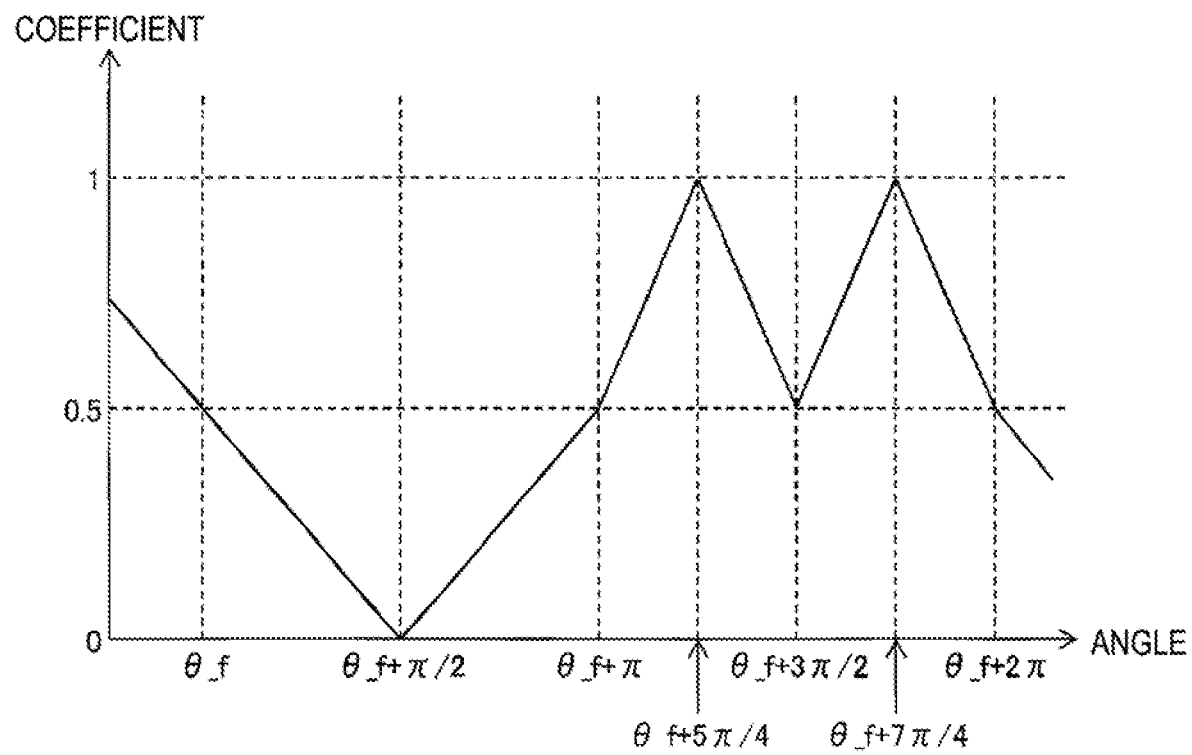
FIG. 12 is a graph illustrating a direction dependency of a coefficient $\gamma(\theta)$ used to calculate an expansion/reduction ratio $\alpha(\theta)$ for correction intensity configuring processing.

Here, FIG. 15E illustrates an image 1508 obtained by correcting the image 1504 illustrated in FIG. 15B in a non-isotropic manner as illustrated in FIG. 12, assuming the inclination of the face as an angle of the rectangular (in the x direction). Because the inclination of the face 1504 is different from the angle of the rectangle, from the correction in a non-isotropic manner, the direction different from the desired direction is strongly corrected, and the shape of the face is unnaturally corrected. According to this embodiment, such an unnatural correction can be avoided.

Note that, as illustrated in FIG. 16A, a face region of a face 1601 can be detected as a face region 1602 corresponding to an inclination of the face 1601 even in the case that a face part cannot be detected, thus allowing a correction based on the correction center, the size of the correction region, and the angle of the face to be made even in the case that only the face region can be detected. FIG. 16B illustrates an image 1603 obtained by correcting the image 1601 illustrated in FIG. 16A in a non-isotropic manner as illustrated in FIG. 12 assuming the inclination of the face as the angle of the rectangular, in which lines from cheeks to a chin are sharpened and a correction is made to provide an image giving a small face impression.

Note that the case that any face part cannot be detected and only the face region indicated by the rectangle can be detected is describe above, but even in a case that the face region and only one face part can detected, it is preferable to correct the face with an isotropic correction amount, because the angle of the face may be difficult to be estimated depending on the detected face part. For example, in a case that the detected face part is a nose only, the inclination of the face is difficult to estimate because a position of the nose is located near the center of the face region. On the other hand, in a case that the detected face part is a chin, the inclination of the face may be possibly estimated based on a position indicated by the rectangle indicating the face region and a position of the chin because the position of the chin is located on a lower side of the face region. In a case that the inclination of the face can be estimated, the correction is possible in a non-isotropic manner.

As described above, in the present embodiment, in a case that the information of the face region and face parts necessary for estimating the inclination of the face cannot be acquired, but the information of the face region and face parts necessary for configuring the correction center and the correction region can be acquired, correcting the face with the isotropic correction amount can avoid correcting the face to an unintended shape due to a correction based on the wrong angle.

Examples Implemented by Processor

The control blocks of the image processing device 100 (in particular, the imaging object detector 101, the correction region setter 102, the correction intensity setter 103, and the image corrector 104) can be implemented by a processor included in the image processing device 100. More specifically, the control blocks may be implemented by software processing performed by a Central Processing Unit (CPU) and a Graphics Processing Unit (GPU), or hardware processing performed by an Application Specific Integrated Circuit (ASIC) and a Field Programmable Gate Array (FPGA).

In the former case, the image processing device 100 includes a CPU performing instructions of a program that is software implementing the functions, a Read Only Memory (ROM) or a storage device (these are referred to as recording media) in which the program and various data are stored to be readable by a computer (or CPU), a Random Access Memory (RAM) in which the program is deployed, and the like. The computer (or CPU) reads from the recording medium and performs the program to achieve the object of the present disclosure. As the above-described recording medium, a "non-transitory tangible medium" such as a tape, a disk, a card, a semiconductor memory, and a programmable logic circuit can be used. The above-described program may be supplied to the above-described computer via an arbitrary transmission medium (such as a communication network and a broadcast wave) capable of transmitting the program.

Note that an aspect of the present disclosure may also be implemented in a form of a data signal embedded in a carrier wave in which the program is embodied by electronic transmission.

Supplement

An image processing device (100) according to Aspect 1 of the present disclosure is an image processing device for correcting an image including a face, the image processing device including: a corrector (image corrector 104) configured to perform, on the image, correction processing to reduce a first correction region of a prescribed shape that is located at a position corresponding to a center of the face and that has a size depending on a size of the face and to expand a second correction region around the first correction region, or correction processing to expand the first correction region and reduce the second correction region.

According to the above-described configuration, the first correction region as a target to reduce (or a target to expand) and the second correction region as a target to expand (or a target to reduce) can be configured based on the center of the face and the size of the face. The center of face and the size of the face can be identified without referring to the positions of the face parts defining the facial contour, such as cheeks and chin. Therefore, according to the above-described configuration, a correction is less likely to be impossible or a correction is less likely to be inappropriate as compared with the image processing device in the related art that requires detection of the face parts defining the facial contour.

In the image processing device according to Aspect 2 of the present disclosure, in above Aspect 1, the prescribed shape may be a circle, the position corresponding to the center of the face may be a center of the circle, and the size depending on the size of the face may be a radius of the circle.

According to the above-described configuration, the configuration of the first correction region and the reduction or expansion of the first correction region can be performed by simple processing.

The image processing device according to Aspect 3 of the present disclosure, in Aspect 1 or 2, may further include a setter (correction region setter 102, correction intensity setter 103) configured to configure the position and the size of the first correction region, based on positions of predetermined face parts in the image, wherein the corrector may determine the first correction region and the second correction region, based on the position and the size of the first correction region configured by the setter.

According to the above-described configuration, the position and size of the first correction region can be preferably determined based on the detected positions of the face parts.

The image processing device according to Aspect 4 of the present disclosure, in Aspect 3, may further include an estimator (correction intensity setter 103) configured to estimate an inclination of the face, based on a position of a specific face part in the image, wherein the setter may configure an expansion/reduction ratio for the first correction region in the correction processing in a non-isotropic manner depending on the inclination of the face estimated by the estimator.

According to the above-described configuration, such a preferable effect can be achieved that a chin of the face is sharpened in the corrected image.

In the image processing device according to Aspect 5 of the present disclosure, in Aspect 3 or 4, the predetermined face parts may be selected from a group including eyes, a nose, a mouth, eyebrows, and ears of the face.

According to the above-described configuration, the position and size of the first correction region can be preferably determined based on the detected positions of the face parts.

The image processing device according to Aspect 6 of the present disclosure, in Aspect 1 or 2, may further include a setter (correction region setter 102, correction intensity setter 103) configured to configure the position and the size of the first correction region, based on positions of face parts successfully detected in the image, among predetermined face parts, wherein the corrector may determine the first correction region and the second correction region, based on the position and the size of the first correction region configured by the setter.

According to the above-described configuration, the position and size of the first correction region can be preferably determined based on the positions of the face parts successfully detected, even in a case that some of the face parts fail to be detected.

The image processing device according to Aspect 7 of the present disclosure, in Aspect 6, may further include an estimator (correction intensity setter 103) configured to estimate an inclination of the face, based on a position of a specific face part in the image, wherein in a case that the specific face part is successfully detected, the setter may configure an expansion/reduction ratio for the first correction region in the correction processing in a non-isotropic manner depending on the inclination of the face estimated by the estimator, and in a case that the specific face part fails to be detected, the setter may configure the expansion/reduction ratio for the first correction region in the correction processing in an isotropic manner.

According to the above-described configuration, in a case that the inclination of the face can be estimated, a preferable effect can be obtained by configuring the expansion/reduction ratio for the first correction region in a non-isotropic manner, and in a case that the inclination of the face cannot be estimated, an unnatural correction can be avoided by configuring the expansion/reduction ratio for the first correction region in an isotropic manner.

In the image processing device according to Aspect 8 of the present disclosure, in Aspect 6 or 7, the face parts may be selected from a group including eyes, a nose, a mouth, eyebrows, ears, a chin, a crown, cheeks, and a contour of the face.

According to the above-described configuration, the position and size of the first correction region can be preferably determined based on the detected positions of the face parts.

An imaging device according to Aspect 9 of the present disclosure include: an imager configured to image the face to acquire the image; and the image processing device according to any one of above-described Aspects 1 to 8 configured to perform image processing on the image including the face imaged by the imager.

According to the above-described configuration, a user can capture a face of a person and easily perform the image processing on the captured image.

The imaging device according to Aspect 10 of the present disclosure, in Aspect 9, may further include a displayer configured to display the image.

According to the above-described configuration, the user can easily confirm an image obtained by performing the image processing on the captured image.

An image printing device according to Aspect 11 of the present disclosure may include: the image processing device according to any one of above-described Aspects 1 to 8; and a printer configured to print an image processed by the image processing device.

According to the above-described configuration, the user can easily print an image obtained by performing the image processing.

An image printing device according to Aspect 12 of the present disclosure may be include an imager configured to image the face to acquire the image, the image processing device according to any one of above-described Aspects 1 to 8, and a printer configured to print an image processed by the image processing device.

According to the above-described configuration, the user can easily print an image obtained by performing the image processing on the imaged image.

The image processing device according to each of the aspects of the present disclosure may be implemented by a computer. In this case, the present disclosure embraces also an image processing program that implements the above image processing device by a computer by causing the computer to operate as each unit (software element) included in the above image processing device, and a computer-readable recording medium recording the program.

An image processing program according to Aspect 13 of the present disclosure is an image processing program causing a processor, the processor being included in an image processing device for correcting an image including a face, to perform, on the image, correction processing to reduce a first correction region of a prescribed shape that is located at a position corresponding to a center of the face and that has a size depending on a size of the face and to expand a second correction region around the first correction region, or correction processing to expand the first correction region and reduce the second correction region.

According to the above-described configuration, an effect is exerted similarly to the image processing device according to Aspect 1 described above.

Supplemental Note

The present disclosure is not limited to each of the above-described embodiments. It is possible to make various modifications within the scope of the claims. An embodiment obtained by appropriately combining technical elements each disclosed in different embodiments falls also within the technical scope of the present disclosure. Further, when technical elements disclosed in the respective embodiments are combined, it is possible to form a new technical feature.

CROSS-REFERENCE OF RELATED APPLICATION

This application claims the benefit of priority to JP 2016-253888 filed on Dec. 27, 2016, which is incorporated herein by reference in its entirety.

REFERENCE SIGNS LIST

1 Image printing device
2 Imaging device
10 Imager
30 Displayer
50 Printer
100 Image processing device
101 Imaging object detector
101a Face detector
101b Face part detector
102 Correction region setter (setter)
103 Correction intensity setter (setter, estimator)
104 Image corrector (corrector)

The invention claimed is:

1. An image processing device for correcting an image including a face, the image processing device comprising:
a setting circuitry configured to configure, in the image, a first correction region of a prescribed shape that is located at a position corresponding to a center of the face and that has a size depending on a size of the face and a second correction region around the first correction region,
a correcting circuitry configured to perform, on the image, correction processing to reduce the first correction region and to expand the second correction region or correction processing to expand the first correction region and reduce the second correction region,
the prescribed shape being a first circle, the position corresponding to the center of the face being a center of the first circle, the size depending on the size of the face being a radius of the first circle,
a shape of an outer periphery of the second correction region being a second circle, the position corresponding to the center of the face being a center of the second circle.

2. The image processing device according to claim 1, wherein
the setting circuitry configures the position and the size of the first correction region, based on positions of predetermined face parts in the image, and
the correcting circuitry performs the correction processing on the first correction region and the second correction region, based on the position and the size of the first correction region configured by the setting circuitry.

3. The image processing device according to claim 2, wherein
the correcting circuitry performs the correction processing on the first correction region so that an expansion ratio of an upper half of the first correction region is different from an expansion ratio of a lower half of the first correction region.

4. The image processing device according to claim 2, wherein
the predetermined face parts are selected from a group including eyes, a nose, a mouth, eyebrows, and ears of the face.

5. The image processing device according to claim 2, wherein
in a case that at least one of the predetermined face parts is detected successfully, the setting circuitry configures the position and the size of the first correction region, based on a position of the at least one of the predetermined face parts in the image, and
the correcting circuitry performs the correction processing on the first correction region and the second correction region, based on the position and the size of the first correction region configured by the setting circuitry.

6. The image processing device according to claim 5, further comprising:
an estimating circuitry configured to estimate an inclination of the face, based on a position of a specific face part in the image, wherein
in a case that the specific face part is successfully detected, the setting circuitry configures an expansion ratio for the first correction region in the correction processing in a non-isotropic manner depending on the inclination of the face estimated by the estimating circuitry, and in a case that the specific face part fails to be detected, the setting circuitry configures the expansion ratio for the first correction region in the correction processing in an isotropic manner.

7. The image processing device according to claim 5, wherein the face parts are selected from a group including eyes, a nose, a mouth, eyebrows, ears, a chin, a crown, cheeks, and a contour of the face.

8. An imaging device comprising:
an imaging circuitry configured to image the face to acquire the image; and
the image processing device according to claim 1 configured to perform image processing on the image including the face imaged by the imaging circuitry.

9. The imaging device according to claim 8, further comprising a displaying circuitry configured to display the image.

10. An image printing device comprising:
the image processing device according to claim 1; and
a printing circuitry configured to print an image processed by the image processing device.

11. An image printing device comprising:
an imaging circuitry configured to image the face to acquire the image;
the image processing device according to claim 1 configured to perform image processing on the image including the face imaged by the imaging circuitry; and
a printing circuitry configured to print an image processed by the image processing device.

12. A non-transitory medium storing therein an image processing program for causing a computer to function as the image processing device according to claim 1, the image processing program causing the computer to function as each of the correcting circuitry and the setting circuitry.

* * * * *